(12) United States Patent
Jeong et al.

(10) Patent No.: US 11,449,054 B2
(45) Date of Patent: Sep. 20, 2022

(54) METHOD FOR CONTROLLING FLIGHT OF UNMANNED AERIAL ROBOT BY UNMANNED AERIAL SYSTEM AND APPARATUS SUPPORTING THE SAME

(71) Applicant: LG ELECTRONICS INC., Seoul (KR)

(72) Inventors: Yuseung Jeong, Seoul (KR); Sanghak Lee, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 16/575,039

(22) Filed: Sep. 18, 2019

(65) Prior Publication Data
US 2020/0033854 A1    Jan. 30, 2020

(30) Foreign Application Priority Data

Aug. 26, 2019 (KR) .......................... 10-2019-0104751

(51) Int. Cl.
*G05D 1/00* (2006.01)
*B64C 25/32* (2006.01)
(Continued)

(52) U.S. Cl.
CPC ........... *G05D 1/0072* (2013.01); *B64C 25/32* (2013.01); *B64C 39/024* (2013.01); *B64D 17/34* (2013.01);
(Continued)

(58) Field of Classification Search
CPC .... G05D 1/0072; G05D 1/0022; G05D 1/101; G05D 1/0858; G05D 1/105; B64C 25/32; B64C 39/024; B64C 2201/042; B64C 2201/108; B64C 2201/123; B64C 2201/126; B64C 2201/127; B64C 2201/128; B64C 2201/141; B64C 2201/146; B64C 2201/165; B64C 2201/185; B64C 27/08; B64C 2201/024; B64D 17/34; B64D 17/62; B64D 27/24;
(Continued)

(56) References Cited

U.S. PATENT DOCUMENTS

2016/0200415 A1* 7/2016 Cooper ................ B64C 39/024
                                                      244/17.15
2017/0129603 A1* 5/2017 Raptopoulos ......... B64C 39/024
(Continued)

FOREIGN PATENT DOCUMENTS

CA        2469680      *  7/2011  ............... B64D 1/08
WO    WO-2019/122842   *  6/2019

*Primary Examiner* — Muhammad Shafi
(74) *Attorney, Agent, or Firm* — Birch, Stewart, Kolasch & Birch, LLP

(57) ABSTRACT

Provided is a method for controlling flight of a drone and an apparatus supporting the same. More specifically, the drone according to the present invention determines whether or not a specific condition is satisfied to deploy a parachute during the flight, and in a case where the specific condition is satisfied, the drone may stop an operation of one or more propellers to deploy the parachute. Next, the drone deploys the parachute, the parachute is deployed toward an area beside the drone, and the flight of the drone may be controlled by adjusting a rotation speed of each of the one or more propellers.

20 Claims, 19 Drawing Sheets

(51) Int. Cl.
| | |
|---|---|
| *B64D 17/34* | (2006.01) |
| *B64D 17/62* | (2006.01) |
| *B64D 27/24* | (2006.01) |
| *G05D 1/10* | (2006.01) |
| *B64C 39/02* | (2006.01) |
| *H04W 84/04* | (2009.01) |

(52) U.S. Cl.
CPC ............. *B64D 17/62* (2013.01); *B64D 27/24* (2013.01); *G05D 1/0022* (2013.01); *G05D 1/101* (2013.01); *B64C 2201/042* (2013.01); *B64C 2201/108* (2013.01); *B64C 2201/123* (2013.01); *B64C 2201/126* (2013.01); *B64C 2201/127* (2013.01); *B64C 2201/128* (2013.01); *B64C 2201/141* (2013.01); *B64C 2201/146* (2013.01); *B64C 2201/165* (2013.01); *B64C 2201/185* (2013.01); *H04W 84/042* (2013.01)

(58) Field of Classification Search
CPC ..... B64D 17/80; B64D 45/00; H04W 84/042; Y02T 50/60
USPC .............................................................. 701/2
See application file for complete search history.

(56) References Cited

U.S. PATENT DOCUMENTS

| | | | |
|---|---|---|---|
| 2019/0086920 A1* | 3/2019 | Miller | B64D 17/80 |
| 2021/0263537 A1* | 8/2021 | Belt | B64C 39/024 |
| 2021/0264799 A1* | 8/2021 | Belt | B60W 60/007 |

* cited by examiner

Model-A:Direct C2     Model-B:Indirect C2

PARACHUTE FORWARD DIRECTION

DRONE FORWARD DIRECTION

DIRECTION CHANGE IF NECESSARY

METHOD FOR CONTROLLING FLIGHT OF UNMANNED AERIAL ROBOT BY UNMANNED AERIAL SYSTEM AND APPARATUS SUPPORTING THE SAME

CROSS-REFERENCE TO RELATED APPLICATIONS

This application claims the benefit of Korea Patent Application No. 10-2019-0104751 filed on Aug. 26, 2019, which is incorporated herein by reference for all purposes as if fully set forth herein.

BACKGROUND OF THE INVENTION

Field of the Invention

The present invention relates to an unmanned aerial system, and more particularly, to a method for increasing a flight duration by controlling flight of an unmanned aerial robot and an apparatus supporting the same.

Related Art

An unmanned flight object collectively refers to an unmanned aerial vehicle (or uninhabited aerial vehicle) (UAV) that is provided in a shape of an aircraft or a helicopter, and flies and steers by induction of radio waves without a pilot. In recent years, the unmanned flight object is widely used in various private commercial fields such as capturing of images, an unmanned delivery service, and a disaster observation, in addition to the military purposes such as reconnaissance and attack.

Meanwhile, an unmanned flight object for a private commercial is operated with limitation due to the lack of infrastructures such as various regulations and authentications, legal systems, and the like, and it is difficult for a person who uses an unmanned flight object to realize potential dangers or dangers to the public. In particular, occurrences of collision accidents, flight on a security region, invasion of privacy, and the like are increasing due to indiscriminate use of the unmanned flight object.

Many countries are trying to improve new regulations, standards, policies, and procedures related to the operation of the unmanned flight object.

SUMMARY OF THE INVENTION

An object of the present invention is to provide a method for controlling flight of an unmanned aerial robot using a 5G system.

Another object of the present invention is to provide a method for increasing a flight duration and a moving distance of an unmanned aerial robot using a parachute provided in the unmanned aerial robot.

Another object of the present invention is to provide a method for preventing a crash of an unmanned aerial robot due to a collision between a parachute and a propeller of the unmanned aerial robot when the parachute provided in the unmanned aerial robot is deployed.

Objects of the present invention are not limited to the above-mentioned objects. That is, other objects that are not mentioned may be obviously understood by those skilled in the art to which the present invention pertains from the following description.

In an aspect, a method for controlling flight of an unmanned aerial robot includes: determining whether or not a specific condition for deploying a parachute during the flight is satisfied; stopping an operation of at least one propeller for deploying the parachute when the specific condition is satisfied; deploying the parachute, the parachute being deployed toward an area beside the unmanned aerial robot; and controlling the flight of the unmanned aerial robot by adjusting a rotation speed of each of the at least one propeller.

The specific condition may be one of receiving a control message instructing deployment of the parachute from a base station, whether or not the unmanned aerial robot reaches a destination, a flight duration increase, or a crash.

The method may further include, when the specific condition is whether or not the unmanned aerial robot reaches a destination: calculating an expected flight distance based on a remaining amount of a battery; and comparing the expected flight distance with a flight distance to the destination, wherein the parachute is deployed when the expected flight distance is smaller than the flight distance.

A propeller closest to the parachute among the at least one propeller may be not operated.

The controlling may comprises: controlling the rotation speed of each of the at least one propeller to prevent a collision between the at least one propeller and the parachute; controlling the rotation speed of each of the at least one propeller to change a direction of the unmanned aerial robot; and controlling the rotation speed of each of the at least one propeller to change a speed of the unmanned aerial robot.

The controlling of the rotation speed of each of the at least one propeller to prevent a collision with the parachute may be performed by comparing an angle between the unmanned aerial robot and the parachute with a threshold value, and the threshold value may mean a minimum angle between the parachute and the unmanned aerial robot for preventing a collision between the at least one propeller and the parachute.

When the angle is equal to or greater than the threshold value, a rotation speed of a propeller positioned in a middle portion of the unmanned aerial robot among the at least one propeller may be increased or decreased, and a rotation speed of a propeller positioned in a lower portion of the unmanned aerial robot among the at least one propeller may be increased or decreased.

In the controlling of the rotation speed of each of the at least one propeller to change a direction of the unmanned aerial robot, a rotation speed of a propeller positioned in a middle portion of the unmanned aerial robot among the at least one propeller may be increased or decreased according to a direction change of the unmanned aerial robot, and a rotation speed of a propeller positioned in a lower portion of the unmanned aerial robot among the at least one propeller may be increased or decreased.

The controlling of the rotation speed of each of the at least one propeller to prevent a collision with the parachute may be performed by comparing a distance between the unmanned aerial robot and the parachute with a threshold value, and the threshold value may mean a minimum distance between the parachute and the unmanned aerial robot for preventing a collision between the at least one propeller and the parachute.

The distance may be measured by a first sensor of the parachute and a second sensor of the unmanned aerial robot.

When the distance is equal to or less than the threshold value, a rotation speed of a propeller positioned in a middle portion of the unmanned aerial robot among the at least one propeller may be increased or decreased, and a rotation speed of a propeller positioned in a lower portion of the unmanned aerial robot among the at least one propeller may be increased or decreased.

The controlling of the rotation speed of each of the at least one propeller to prevent a collision with the parachute may be performed by comparing a first speed of the unmanned aerial robot with a second speed of the parachute.

When the first speed is less than the second speed, the first speed may be decreased by decreasing the rotation speed of each of the at least one propeller.

In another aspect, an unmanned aerial robot includes: a main body; one or more motors; at least one propeller connected to the one or more motors, respectively; a transmitter and a receiver, respectively, transmitting and receiving a radio signal; and a processor electrically connected to the one or more motors to control the one or more motors and functionally connected to the transmitter and the receiver, wherein the processor is configured to: determine whether or not a specific condition for deploying a parachute during flight is satisfied; stop an operation of each of the at least one propeller for deploying the parachute when the specific condition is satisfied; deploy a parachute based on the control message, wherein the parachute is deployed to the side of the unmanned aerial robot; and control the flight of the unmanned aerial robot by adjusting a rotation speed of each of the at least one propeller.

BRIEF DESCRIPTION OF THE DRAWINGS

The accompanying drawings, included as part of the detailed description in order to help understanding of the present invention, provide embodiments of the present invention and describe the technical characteristics of the present invention along with the detailed description.

DESCRIPTION OF EXEMPLARY EMBODIMENTS

Figure 1:
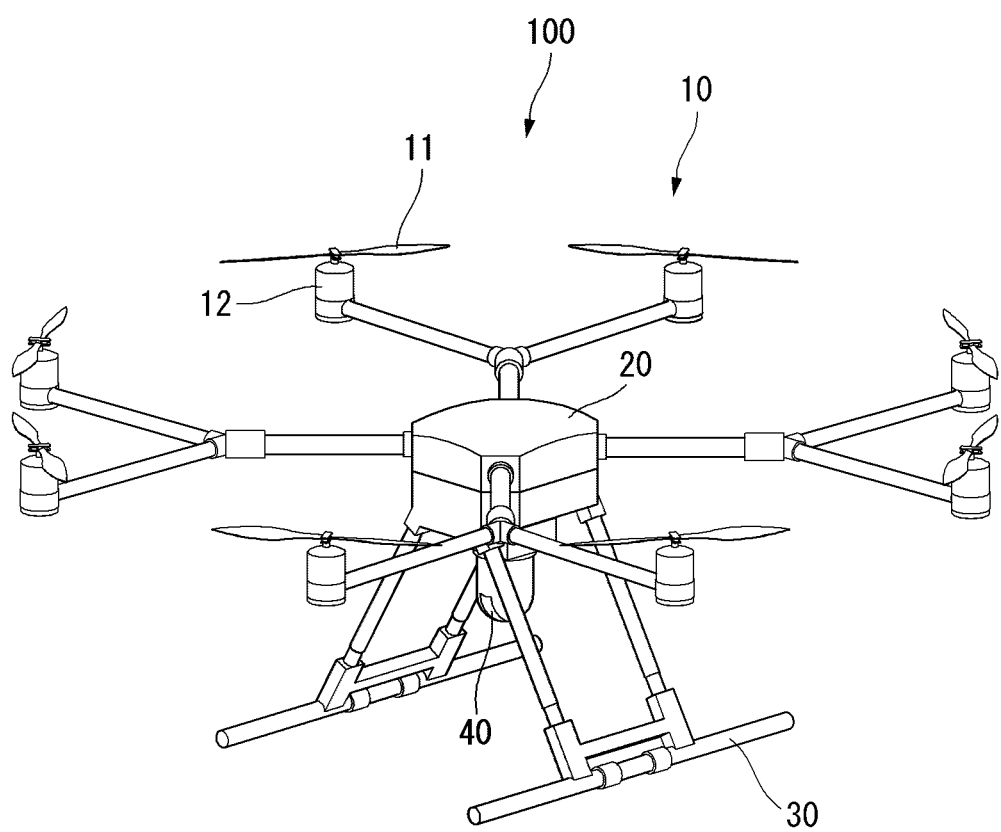
FIG. 1 shows a perspective view of an unmanned aerial vehicle to which a method proposed in this specification is applicable.

It is noted that technical terms used in this specification are used to explain a specific embodiment and are not intended to limit the present invention. In addition, technical terms used in this specification agree with the meanings as understood by a person skilled in the art unless defined to the contrary and should be interpreted in the context of the related technical writings not too ideally or impractically.

Furthermore, if a technical term used in this specification is an incorrect technical term that cannot correctly represent the spirit of the present invention, this should be replaced by a technical term that can be correctly understood by those skill in the air to be understood. Further, common terms as found in dictionaries should be interpreted in the context of the related technical writings not too ideally or impractically unless this disclosure expressly defines them so.

Further, an expression of the singular number may include an expression of the plural number unless clearly defined otherwise in the context. The term "comprises" or "includes" described herein should be interpreted not to exclude other elements or steps but to further include such other elements or steps since the corresponding elements or steps may be included unless mentioned otherwise.

In addition, it is to be noted that the suffixes of elements used in the following description, such as a "module" and a "unit", are assigned or interchangeable with each other by taking into consideration only the ease of writing this specification, but in themselves are not particularly given distinct meanings and roles.

Further, terms including ordinal numbers, such as the first and the second, may be used to describe various elements, but the elements are not restricted by the terms. The terms are used to only distinguish one element from the other element. For example, a first component may be called a second component and the second component may also be called the first component without departing from the scope of the present invention.

Hereinafter, preferred embodiments according to the present invention are described in detail with reference to the accompanying drawings. The same reference numerals are assigned to the same or similar elements regardless of their reference numerals, and redundant descriptions thereof are omitted.

FIG. 1 shows a perspective view of an unmanned aerial vehicle according to an embodiment of the present invention.

First, the unmanned aerial vehicle 100 is manually manipulated by an administrator on the ground, or it flies in an unmanned manner while it is automatically piloted by a configured flight program. The unmanned aerial vehicle 100, as in FIG. 1, includes a main body 20, a horizontal and vertical movement propulsion device 10, and landing legs 130.

The main body 20 is a body portion on which a module, such as a task unit 40, is mounted.

The horizontal and vertical movement propulsion device 10 includes one or more propellers 11 positioned vertically to the main body 20. The horizontal and vertical movement propulsion device 10 according to an embodiment of the present invention includes a plurality of propellers 11 and motors 12, which are spaced apart. In this case, the horizontal and vertical movement propulsion device 10 may have an air jet propeller structure not the propeller 11.

A plurality of propeller supports are radially formed in the main body 20. The motor 12 may be mounted on each of the propeller supports. The propeller 11 is mounted on each motor 12.

The plurality of propellers 11 may be disposed symmetrically with respect to the main body 20. Furthermore, the rotation direction of the motor 12 may be determined so that the clockwise and counterclockwise rotation directions of the plurality of propellers 11 are combined. The rotation direction of one pair of the propellers 11 symmetrical with respect to the main body 20 may be set identically (e.g., clockwise). Furthermore, the other pair of the propellers 11 may have a rotation direction opposite (e.g., counterclockwise) that of the one pair of the propellers 11.

The landing legs 30 are disposed with being spaced apart at the bottom of the main body 20. Furthermore, a buffering support member (not shown) for minimizing an impact attributable to a collision with the ground when the unmanned aerial vehicle 100 makes a landing may be mounted on the bottom of the landing leg 30. The unmanned aerial vehicle 100 may have various aerial vehicle structures different from that described above.

Figure 2:
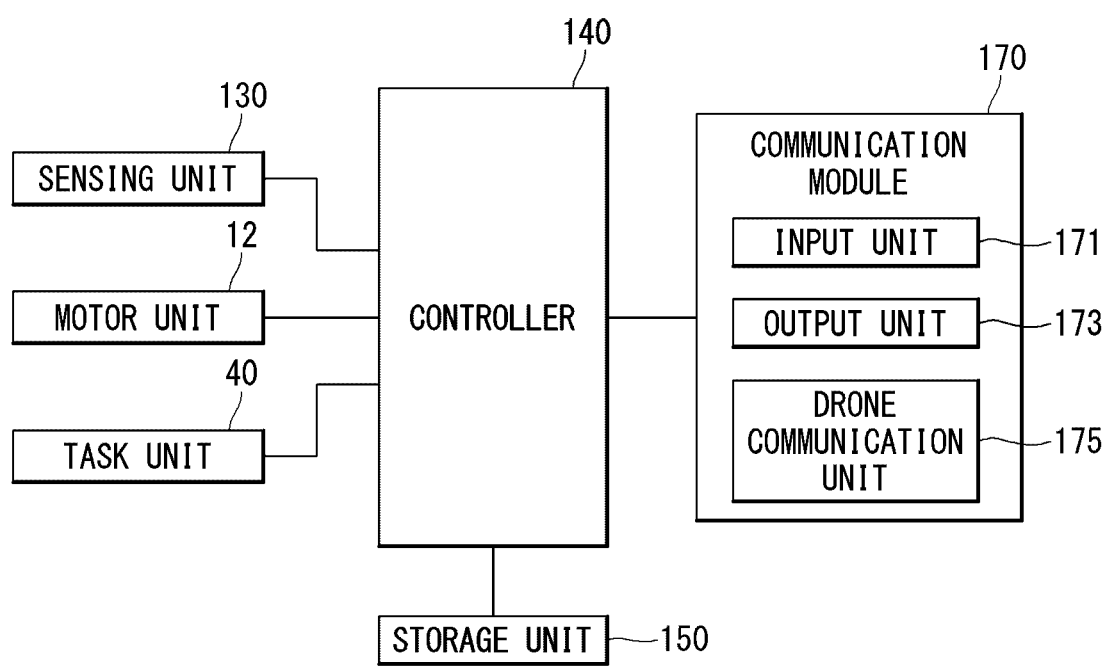
FIG. 2 is a block diagram showing a control relation between major elements of the unmanned aerial vehicle of FIG. 1.

FIG. 2 is a block diagram showing a control relation between major elements of the unmanned aerial vehicle of FIG. 1.

Referring to FIG. 2, the unmanned aerial vehicle 100 measures its own flight state using a variety of types of sensors in order to fly stably. The unmanned aerial vehicle 100 may include a sensing unit 130 including at least one sensor.

The flight state of the unmanned aerial vehicle 100 is defined as rotational states and translational states.

The rotational states mean "yaw", "pitch", and "roll." The translational states mean longitude, latitude, altitude, and velocity.

In this case, "roll", "pitch", and "yaw" are called Euler angle, and indicate that the x, y, z three axes of an aircraft body frame coordinate have been rotated with respect to a given specific coordinate, for example, three axes of NED coordinates N, E, D. If the front of an aircraft is rotated left and right on the basis of the z axis of a body frame coordinate, the x axis of the body frame coordinate has an angle difference with the N axis of the NED coordinate, and this angle is called "yaw" ($\Psi$). If the front of an aircraft is rotated up and down on the basis of the y axis toward the right, the z axis of the body frame coordinate has an angle difference with the D axis of the NED coordinates, and this angle is called a "pitch" ($\theta$). If the body frame of an aircraft is inclined left and right on the basis of the x axis toward the front, the y axis of the body frame coordinate has an angle to the E axis of the NED coordinates, and this angle is called "roll" ($\Phi$).

The unmanned aerial vehicle 100 uses 3-axis gyroscopes, 3-axis accelerometers, and 3-axis magnetometers in order to measure the rotational states, and uses a GPS sensor and a barometric pressure sensor in order to measure the translational states.

The sensing unit 130 of the present invention includes at least one of the gyroscopes, the accelerometers, the GPS sensor, the image sensor or the barometric pressure sensor. In this case, the gyroscopes and the accelerometers measure the states in which the body frame coordinates of the unmanned aerial vehicle 100 have been rotated and accelerated with respect to earth centered inertial coordinate. The gyroscopes and the accelerometers may be fabricated as a single chip called an inertial measurement unit (IMU) using a micro-electro-mechanical systems (MEMS) semiconductor process technology.

Furthermore, the IMU chip may include a microcontroller for converting measurement values based on the earth centered inertial coordinates, measured by the gyroscopes and the accelerometers, into local coordinates, for example, north-east-down (NED) coordinates used by GPSs.

The gyroscopes measure angular velocity at which the body frame coordinate x, y, z three axes of the unmanned aerial vehicle 100 rotate with respect to the earth centered inertial coordinates, calculate values (Wx.gyro, Wy.gyro, Wz.gyro) converted into fixed coordinates, and convert the values into Euler angles ($\Phi$gyro, $\theta$gyro, $\psi$gyro) using a linear differential equation.

The accelerometers measure acceleration for the earth centered inertial coordinates of the body frame coordinate x, y, z three axes of the unmanned aerial vehicle 100, calculate values (fx,acc, fy,acc, fz,acc) converted into fixed coordinates, and convert the values into "roll ($\Phi$acc)" and "pitch ($\theta$acc)." The values are used to remove a bias error included in "roll ($\Phi$gyro)" and "pitch ($\theta$gyro)" using measurement values of the gyroscopes.

The magnetometers measure the direction of magnetic north points of the body frame coordinate x, y, z three axes of the unmanned aerial vehicle 100, and calculate a "yaw" value for the NED coordinates of body frame coordinates using the value.

The GPS sensor calculates the translational states of the unmanned aerial vehicle 100 on the NED coordinates, that is, a latitude (Pn.GPS), a longitude (Pe.GPS), an altitude (hMSL.GPS), velocity (Vn.GPS) on the latitude, velocity (Ve.GPS) on longitude, and velocity (Vd.GPS) on the altitude, using signals received from GPS satellites. In this case, the subscript MSL means a mean sea level (MSL).

The barometric pressure sensor may measure the altitude (hALP.baro) of the unmanned aerial vehicle 100. In this case, the subscript ALP means an air-level pressor. The barometric pressure sensor calculates a current altitude from a take-off point by comparing an air-level pressor when the unmanned aerial vehicle 100 takes off with an air-level pressor at a current flight altitude.

The camera sensor may include an image sensor (e.g., CMOS image sensor), including at least one optical lens and multiple photodiodes (e.g., pixels) on which an image is focused by light passing through the optical lens, and a digital signal processor (DSP) configuring an image based on signals output by the photodiodes. The DSP may generate a moving image including frames configured with a still image, in addition to a still image.

The unmanned aerial vehicle 100 includes a communication module 170 for inputting or receiving information or outputting or transmitting information. The communication module 170 may include a unmanned aerial robot communication unit 175 for transmitting/receiving information to/from a different external device. The communication module 170 may include an input unit 171 for inputting information. The communication module 170 may include an output unit 173 for outputting information.

The output unit 173 may be omitted from the unmanned aerial vehicle 100, and may be formed in a terminal 300.

For example, the unmanned aerial vehicle 100 may directly receive information from the input unit 171. For another example, the unmanned aerial vehicle 100 may receive information, input to a separate terminal 300 or server 200, through the unmanned aerial robot communication unit 175.

For example, the unmanned aerial vehicle 100 may directly output information to the output unit 173. For another example, the unmanned aerial vehicle 100 may transmit information to a separate terminal 300 through the unmanned aerial robot communication unit 175 so that the terminal 300 outputs the information.

The unmanned aerial robot communication unit 175 may be provided to communicate with an external server 200, an external terminal 300, etc. The unmanned aerial robot communication unit 175 may receive information input from the terminal 300, such as a smartphone or a computer. The unmanned aerial robot communication unit 175 may transmit information to be transmitted to the terminal 300. The terminal 300 may output information received from the unmanned aerial robot communication unit 175.

The unmanned aerial robot communication unit 175 may receive various command signals from the terminal 300 or/and the server 200. The unmanned aerial robot communication unit 175 may receive area information for driving, a driving route, or a driving command from the terminal 300 or/and the server 200. In this case, the area information may include flight restriction area (A) information and approach restriction distance information.

The input unit 171 may receive On/Off or various commands. The input unit 171 may receive area information. The input unit 171 may receive object information. The input unit 171 may include various buttons or a touch pad or a microphone.

The output unit 173 may notify a user of various pieces of information. The output unit 173 may include a speaker and/or a display. The output unit 173 may output information on a discovery detected while driving. The output unit 173 may output identification information of a discovery. The output unit 173 may output location information of a discovery.

The unmanned aerial vehicle 100 includes a controller 140 for processing and determining various pieces of information, such as mapping and/or a current location. The controller 140 may control an overall operation of the unmanned aerial vehicle 100 through control of various elements that configure the unmanned aerial vehicle 100.

The controller 140 may receive information from the communication module 170 and process the information. The controller 140 may receive information from the input unit 171, and may process the information. The controller 140 may receive information from the unmanned aerial robot communication unit 175, and may process the information.

The controller 140 may receive sensing information from the sensing unit 130, and may process the sensing information.

The controller 140 may control the driving of the motor 12. The controller 140 may control the operation of the task unit 40.

The unmanned aerial vehicle 100 includes a storage unit 150 for storing various data. The storage unit 150 records various pieces of information necessary for control of the unmanned aerial vehicle 100, and may include a volatile or non-volatile recording medium.

A map for a driving area may be stored in the storage unit 150. The map may have been input by the external terminal 300 capable of exchanging information with the unmanned aerial vehicle 100 through the unmanned aerial robot communication unit 175, or may have been autonomously learnt and generated by the unmanned aerial vehicle 100. In the former case, the external terminal 300 may include a remote controller, a PDA, a laptop, a smartphone or a tablet on which an application for a map configuration has been mounted, for example.

Figure 3:
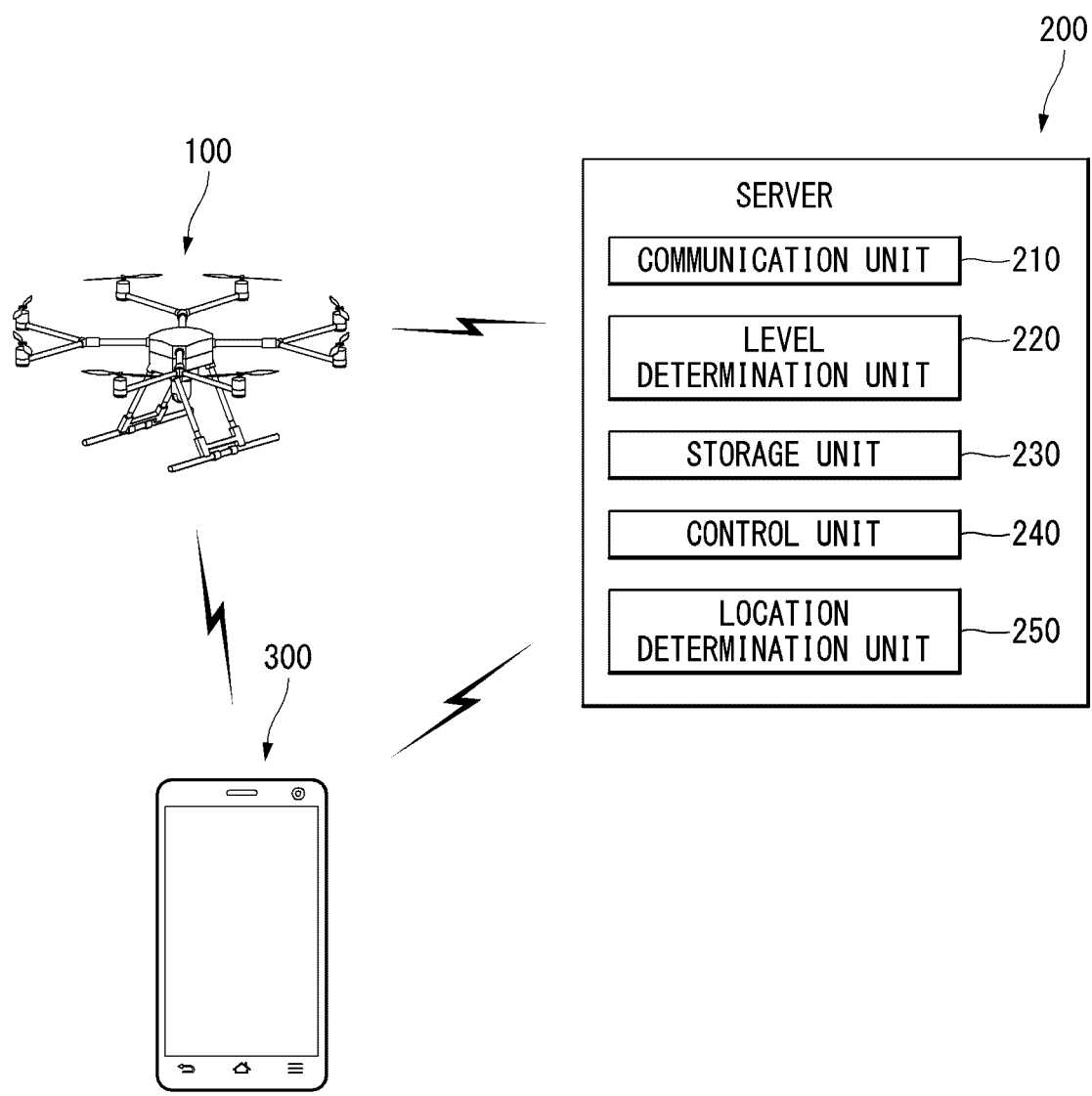
FIG. 3 is a block diagram showing a control relation between major elements of an aerial control system according to an embodiment of the present invention.

FIG. 3 is a block diagram showing a control relation between major elements of an aerial control system according to an embodiment of the present invention.

Referring to FIG. 3, the aerial control system according to an embodiment of the present invention may include the unmanned aerial vehicle 100 and the server 200, or may include the unmanned aerial vehicle 100, the terminal 300, and the server 200. The unmanned aerial vehicle 100, the terminal 300, and the server 200 are interconnected using a wireless communication method.

Global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc. may be used as the wireless communication method.

A wireless Internet technology may be used as the wireless communication method. The wireless Internet technology includes a wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and 5 G, for example. In particular, a faster response is possible by transmitting/receiving data using a 5G communication network.

In this specification, a base station has a meaning as a terminal node of a network that directly performs communication with a terminal. In this specification, a specific operation illustrated as being performed by a base station may be performed by an upper node of the base station in some cases. That is, it is evident that in a network configured with a plurality of network nodes including a base station, various operations performed for communication with a terminal may be performed by the base station or different network nodes other than the base station. A "base station (BS)" may be substituted with a term, such as a fixed station, a Node B, an evolved-NodeB (eNB), a base transceiver system (BTS), an access point (AP), or a next generation NodeB (gNB). Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, downlink (DL) means communication from a base station to a terminal. Uplink (UL) means communication from a terminal to a base station. In the downlink, a transmitter may be part of a base station, and a receiver may be part of a terminal. In the uplink, a transmitter may be part of a terminal, and a receiver may be part of a base station.

Specific terms used in the following description have been provided to help understanding of the present invention. The use of such a specific term may be changed into another form without departing from the technical spirit of the present invention.

Embodiments of the present invention may be supported by standard documents disclosed in at least one of IEEE 802, 3GPP and 3GPP2, that is, radio access systems. That is, steps or portions not described in order not to clearly disclose the technical spirit of the present invention in the embodiments of the present invention may be supported by the documents. Furthermore, all terms disclosed in this document may be described by the standard documents.

In order to clarity the description, 3GPP 5 G is chiefly described, but the technical characteristic of the present invention is not limited thereto.

UE and 5 G Network Block Diagram Example

Figure 4:
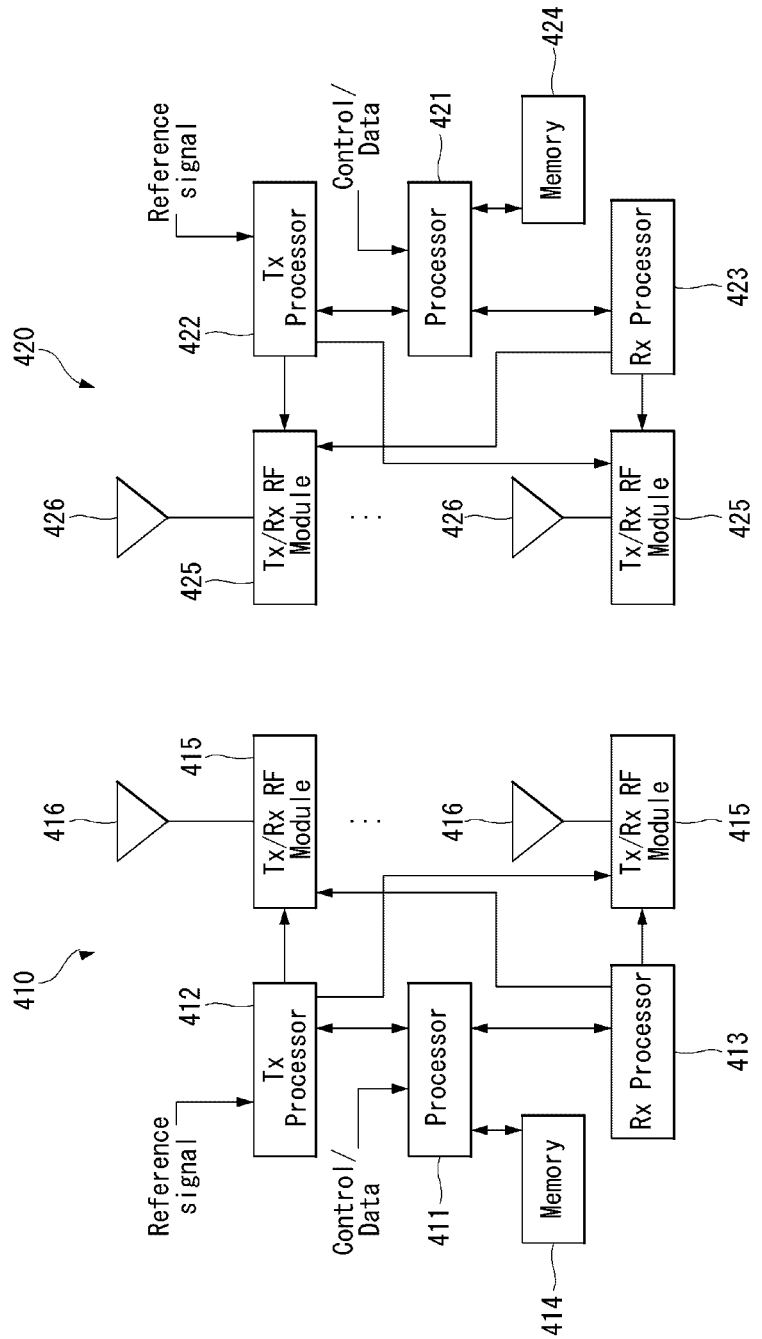
FIG. 4 illustrates a block diagram of a wireless communication system to which methods proposed in this specification are applicable.

FIG. 4 illustrates a block diagram of a wireless communication system to which methods proposed in this specification are applicable.

Referring to FIG. 4, an unmanned aerial robot is defined as a first communication device (910 of FIG. 4). A processor 911 may perform a detailed operation of the drone.

The unmanned aerial robot may be represented as an unmanned aerial vehicle or drone.

A 5G network communicating with an unmanned aerial robot may be defined as a second communication device (920 of FIG. 4). A processor 921 may perform a detailed operation of the unmanned aerial robot. In this case, the 5G network may include another unmanned aerial robot communicating with the unmanned aerial robot.

A 5 G network maybe represented as a first communication device, and a unmanned aerial robot may be represented as a second communication device.

For example, the first communication device or the second communication device may be a base station, a network node, a transmission terminal, a reception terminal, a wireless apparatus, a wireless communication device or an unmanned aerial robot.

For example, a terminal or a user equipment (UE) may include an unmanned aerial robot, an unmanned aerial vehicle (UAV), a mobile phone, a smartphone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD). For example, the HMD may be a display device of a form, which is worn on the head. For example, the HMD may be used to implement VR, AR or MR. Referring to FIG. 4, the first communication device 910, the second communication device 920 includes a processor 911, 921, a memory 914, 924, one or more Tx/Rx radio frequency (RF) modules 915, 925, a Tx processor 912, 922, an Rx processor 913, 923, and an antenna 916, 926. The Tx/Rx module is also called a transceiver. Each Tx/Rx module 915 transmits a signal each antenna 926. The processor implements the above-described function, process and/or method. The processor 921 may be related to the memory 924 for storing a program code and data. The memory may be referred to as a computer-readable recording medium. More specifically, in the DL (communication from the first communication device to the second communication device), the transmission (TX) processor 912 implements various signal processing functions for the L1 layer (i.e., physical layer). The reception (RX) processor implements various signal processing functions for the L1 layer (i.e., physical layer).

UL (communication from the second communication device to the first communication device) is processed by the first communication device 910 using a method similar to that described in relation to a receiver function in the second communication device 920. Each Tx/Rx module 925 receives a signal through each antenna 926. Each Tx/Rx module provides an RF carrier and information to the RX processor 923. The processor 921 may be related to the memory 924 for storing a program code and data. The memory may be referred to as a computer-readable recording medium.

Signal Transmission/Reception Method in Wireless Communication System

Figure 5:
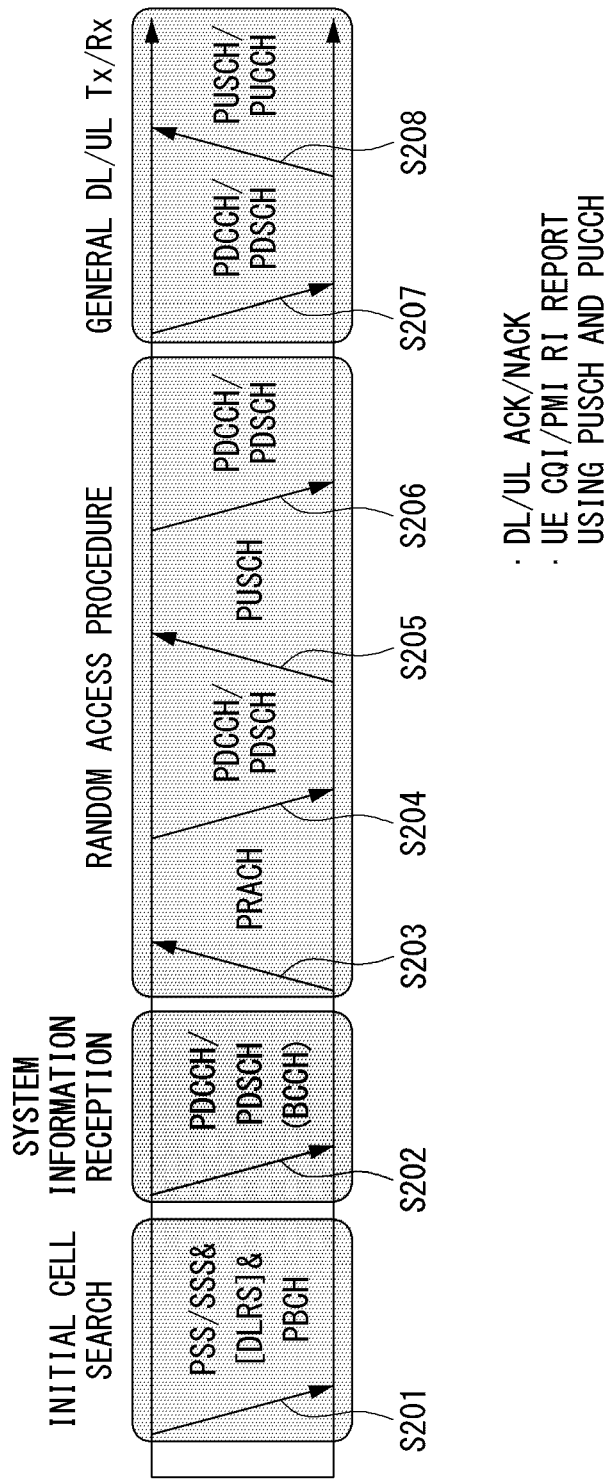
FIG. 5 is a diagram showing an example of a signal transmission/reception method in a wireless communication system.

FIG. 5 is a diagram showing an example of a signal transmission/reception method in a wireless communication system.

FIG. 5 shows the physical channels and general signal transmission used in a 3GPP system. In the wireless communication system, the terminal receives information from the base station through the downlink (DL), and the terminal transmits information to the base station through the uplink (UL). The information which is transmitted and received between the base station and the terminal includes data and various control information, and various physical channels exist according to a type/usage of the information transmitted and received therebetween.

When power is turned on or the terminal enters a new cell, the terminal performs initial cell search operation such as synchronizing with the base station (S201). To this end, the terminal may receive a primary synchronization signal (PSS) and a secondary synchronization signal (SSS) from the base station to synchronize with the base station and obtain information such as a cell ID. Thereafter, the terminal may receive a physical broadcast channel (PBCH) from the base station to obtain broadcast information in a cell. Meanwhile, the terminal may check a downlink channel state by receiving a downlink reference signal (DL RS) in an initial cell search step.

After the terminal completes the initial cell search, the terminal may obtain more specific system information by receiving a physical downlink control channel (PDSCH) according to a physical downlink control channel (PDCCH) and information on the PDCCH (S202).

When the terminal firstly connects to the base station or there is no radio resource for signal transmission, the terminal may perform a random access procedure (RACH) for the base station (S203 to S206). To this end, the terminal may transmit a specific sequence to a preamble through a physical random access channel (PRACH) (S203 and S205), and receive a response message (RAR (Random Access Response) message) for the preamble through the PDCCH and the corresponding PDSCH. In case of a contention-based RACH, a contention resolution procedure may be additionally performed (S206).

After the terminal performs the procedure as described above, as a general uplink/downlink signal transmission procedure, the terminal may perform a PDCCH/PDSCH reception (S207) and physical uplink shared channel (PUSCH)/physical uplink control channel (PUCCH) transmission (S208). In particular, the terminal may receive downlink control information (DCI) through the PDCCH. Here, the DCI includes control information such as resource allocation information for the terminal, and the format may be applied differently according to a purpose of use.

Meanwhile, the control information transmitted by the terminal to the base station through the uplink or received by the terminal from the base station may include a downlink/uplink ACK/NACK signal, a channel quality indicator (CQI), a precoding matrix index (PMI), and a rank indicator (RI), or the like. The terminal may transmit the above-described control information such as CQI/PMI/RI through PUSCH and/or PUCCH.

An initial access (IA) procedure in a 5G communication system is additionally described with reference to FIG. 5.

A UE may perform cell search, system information acquisition, beam alignment for initial access, DL measurement, etc. based on an SSB. The SSB is interchangeably used with a synchronization signal/physical broadcast channel (SS/PBCH) block.

An SSB is configured with a PSS, an SSS and a PBCH. The SSB is configured with four contiguous OFDM symbols. A PSS, a PBCH, an SSS/PBCH or a PBCH is transmitted for each OFDM symbol. Each of the PSS and the SSS is configured with one OFDM symbol and 127 subcarriers. The PBCH is configured with three OFDM symbols and 576 subcarriers.

Cell search means a process of obtaining, by a UE, the time/frequency synchronization of a cell and detecting the cell identifier (ID) (e.g., physical layer cell ID (PCI)) of the cell. A PSS is used to detect a cell ID within a cell ID group. An SSS is used to detect a cell ID group. A PBCH is used for SSB (time) index detection and half-frame detection.

There are 336 cell ID groups. 3 cell IDs are present for each cell ID group. A total of 1008 cell IDs are present. Information on a cell ID group to which the cell ID of a cell belongs is provided/obtained through the SSS of the cell. Information on a cell ID among the 336 cells within the cell ID is provided/obtained through a PSS.

An SSB is periodically transmitted based on SSB periodicity. Upon performing initial cell search, SSB base periodicity assumed by a UE is defined as 20 ms. After cell access, SSB periodicity may be set as one of {5 ms, 10 ms, 20 ms, 40 ms, 80 ms, 160 ms} by a network (e.g., BS).

Next, system information (SI) acquisition is described.

SI is divided into a master information block (MIB) and a plurality of system information blocks (SIBs). SI other than the MIB may be called remaining minimum system information (RMSI). The MIB includes information/parameter for the monitoring of a PDCCH that schedules a PDSCH carrying SystemInformationBlock1 (SIB1), and is transmitted by a BS through the PBCH of an SSB. SIB1 includes information related to the availability of the remaining SIBs (hereafter, SIBx, x is an integer of 2 or more) and scheduling (e.g., transmission periodicity, SI-window size). SIBx includes an SI message, and is transmitted through a PDSCH. Each SI message is transmitted within a periodically occurring time window (i.e., SI-window).

A random access (RA) process in a 5G communication system is additionally described with reference to FIG. 5.

A random access process is used for various purposes. For example, a random access process may be used for network initial access, handover, UE-triggered UL data transmission. A UE may obtain UL synchronization and an UL transmission resource through a random access process. The random access process is divided into a contention-based random access process and a contention-free random access process. A detailed procedure for the contention-based random access process is described below.

A UE may transmit a random access preamble through a PRACH as Msg1 of a random access process in the UL. Random access preamble sequences having two different lengths are supported. A long sequence length 839 is applied to subcarrier spacings of 1.25 and 5 kHz, and a short sequence length 139 is applied to subcarrier spacings of 15, 30, 60 and 120 kHz.

When a BS receives the random access preamble from the UE, the BS transmits a random access response (RAR) message (Msg2) to the UE. A PDCCH that schedules a PDSCH carrying an RAR is CRC masked with a random access (RA) radio network temporary identifier (RNTI) (RA-RNTI), and is transmitted. The UE that has detected the PDCCH masked with the RA-RNTI may receive the RAR from the PDSCH scheduled by DCI carried by the PDCCH. The UE identifies whether random access response information for the preamble transmitted by the UE, that is, Msg1, is present within the RAR. Whether random access information for Msg1 transmitted by the UE is present may be determined by determining whether a random access preamble ID for the preamble transmitted by the UE is present. If a response for Msg1 is not present, the UE may retransmit an RACH preamble within a given number, while performing power ramping. The UE calculates PRACH transmission power for the retransmission of the preamble based on the most recent pathloss and a power ramping counter.

The UE may transmit UL transmission as Msg3 of the random access process on an uplink shared channel based on random access response information. Msg3 may include an RRC connection request and a UE identity. As a response to the Msg3, a network may transmit Msg4, which may be treated as a contention resolution message on the DL. The UE may enter an RRC connected state by receiving the Msg4.

Beam Management (BM) Procedure of 5G Communication System

A BM process may be divided into (1) a DL BM process using an SSB or CSI-RS and (2) an UL BM process using a sounding reference signal (SRS). Furthermore, each BM process may include Tx beam sweeping for determining a Tx beam and Rx beam sweeping for determining an Rx beam.

A DL BM process using an SSB is described.

The configuration of beam reporting using an SSB is performed when a channel state information (CSI)/beam configuration is performed in RRC_CONNECTED.

- A UE receives, from a BS, a CSI-ResourceConfig IE including CSI-SSB-ResourceSetList for SSB resources used for BM. RRC parameter csi-SSB-ResourceSetList indicates a list of SSB resources used for beam management and reporting in one resource set. In this case, the SSB resource set may be configured with {SSBx1, SSBx2, SSBx3, SSBx4, . . . }. SSB indices may be defined from 0 to 63.
- The UE receives signals on the SSB resources from the BS based on the CSI-SSB-ResourceSetList.
- If SSBRI and CSI-RS reportConfig related to the reporting of reference signal received power (RSRP) have been configured, the UE reports the best SSBRI and corresponding RSRP to the BS. For example, if reportQuantity of the CSI-RS reportConfig IE is configured as "ssb-Index-RSRP", the UE reports the best SSBRI and corresponding RSRP to the BS.

If a CSI-RS resource is configured in an OFDM symbol(s) identical with an SSB and "QCL-TypeD" is applicable, the UE may assume that the CSI-RS and the SSB have been quasi co-located (QCL) in the viewpoint of "QCL-TypeD." In this case, QCL-TypeD may mean that antenna ports have been QCLed in the viewpoint of a spatial Rx parameter. The UE may apply the same reception beam when it receives the signals of a plurality of DL antenna ports having a QCL-TypeD relation.

Next, a DL BM process using a CSI-RS is described.

An Rx beam determination (or refinement) process of a UE and a Tx beam sweeping process of a BS using a CSI-RS are sequentially described. In the Rx beam determination process of the UE, a parameter is repeatedly set as "ON." In the Tx beam sweeping process of the BS, a parameter is repeatedly set as "OFF."

First, the Rx beam determination process of a UE is described.

The UE receives an NZP CSI-RS resource set IE, including an RRC parameter regarding "repetition", from a BS through RRC signaling. In this case, the RRC parameter "repetition" has been set as "ON."

The UE repeatedly receives signals on a resource(s) within a CSI-RS resource set in which the RRC parameter "repetition" has been set as "ON" in different OFDM symbols through the same Tx beam (or DL spatial domain transmission filter) of the BS.

The UE determines its own Rx beam.

The UE omits CSI reporting. That is, if the RRC parameter "repetition" has been set as "ON", the UE may omit CSI reporting.

Next, the Tx beam determination process of a BS is described.

A UE receives an NZP CSI-RS resource set IE, including an RRC parameter regarding "repetition", from the BS through RRC signaling. In this case, the RRC parameter "repetition" has been set as "OFF", and is related to the Tx beam sweeping process of the BS.

The UE receives signals on resources within a CSI-RS resource set in which the RRC parameter "repetition" has been set as "OFF" through different Tx beams (DL spatial domain transmission filter) of the BS.

The UE selects (or determines) the best beam.

The UE reports, to the BS, the ID (e.g., CRI) of the selected beam and related quality information (e.g., RSRP). That is, the UE reports, to the BS, a CRI and corresponding RSRP, if a CSI-RS is transmitted for BM.

Next, an UL BM process using an SRS is described.

A UE receives, from a BS, RRC signaling (e.g., SRS-Config IE) including a use parameter configured (RRC parameter) as "beam management." The SRS-Config IE is used for an SRS transmission configuration. The SRS-Config IE includes a list of SRS-Resources and a list of SRS-ResourceSets. Each SRS resource set means a set of SRS-resources.

The UE determines Tx beamforming for an SRS resource to be transmitted based on SRS-SpatialRelation Info included in the SRS-Config IE. In this case, SRS-SpatialRelation Info is configured for each SRS resource, and indicates whether to apply the same beamforming as beamforming used in an SSB, CSI-RS or SRS for each SRS resource.

If SRS-SpatialRelationInfo is configured in the SRS resource, the same beamforming as beamforming used in the SSB, CSI-RS or SRS is applied, and transmission is performed. However, if SRS-SpatialRelationInfo is not configured in the SRS resource, the UE randomly determines Tx beamforming and transmits an SRS through the determined Tx beamforming.

Next, a beam failure recovery (BFR) process is described.

In a beamformed system, a radio link failure (RLF) frequently occurs due to the rotation, movement or beamforming blockage of a UE. Accordingly, in order to prevent an RLF from occurring frequently, BFR is supported in NR. BFR is similar to a radio link failure recovery process, and may be supported when a UE is aware of a new candidate beam(s). For beam failure detection, a BS configures beam failure detection reference signals in a UE. If the number of beam failure indications from the physical layer of the UE reaches a threshold set by RRC signaling within a period configured by the RRC signaling of the BS, the UE declares a beam failure. After a beam failure is detected, the UE triggers beam failure recovery by initiating a random access process on a PCell, selects a suitable beam, and performs beam failure recovery (if the BS has provided dedicated random access resources for certain beams, they are prioritized by the UE). When the random access procedure is completed, the beam failure recovery is considered to be completed.

Ultra-Reliable and Low Latency Communication (URLLC)

URLLC transmission defined in NR may mean transmission for (1) a relatively low traffic size, (2) a relatively low arrival rate, (3) extremely low latency requirement (e.g., 0.5, 1 ms), (4) relatively short transmission duration (e.g., 2 OFDM symbols), and (5) an urgent service/message. In the case of the UL, in order to satisfy more stringent latency requirements, transmission for a specific type of traffic (e.g., URLLC) needs to be multiplexed with another transmission (e.g., eMBB) that has been previously scheduled. As one scheme related to this, information indicating that a specific resource will be preempted is provided to a previously scheduled UE, and the URLLC UE uses the corresponding resource for UL transmission.

In the case of NR, dynamic resource sharing between eMBB and URLLC is supported. eMBB and URLLC services may be scheduled on non-overlapping time/frequency resources. URLLC transmission may occur in resources scheduled for ongoing eMBB traffic. An eMBB UE may not be aware of whether the PDSCH transmission of a corresponding UE has been partially punctured. The UE may not decode the PDSCH due to corrupted coded bits. NR provides a preemption indication by taking this into consideration. The preemption indication may also be denoted as an interrupted transmission indication.

In relation to a preemption indication, a UE receives a DownlinkPreemption IE through RRC signaling from a BS. When the UE is provided with the DownlinkPreemption IE, the UE is configured with an INT-RNTI provided by a parameter int-RNTI within a DownlinkPreemption IE for the monitoring of a PDCCH that conveys DCI format 2_1. The UE is configured with a set of serving cells by INT-ConfigurationPerServing Cell, including a set of serving cell indices additionally provided by servingCellID, and a corresponding set of locations for fields within DCI format 2_1 by positionInDCI, configured with an information payload size for DCI format 2_1 by dci-PayloadSize, and configured with the indication granularity of time-frequency resources by timeFrequencySect.

The UE receives DCI format 2_1 from the BS based on the DownlinkPreemption IE.

When the UE detects DCI format 2_1 for a serving cell within a configured set of serving cells, the UE may assume that there is no transmission to the UE within PRBs and symbols indicated by the DCI format 2_1, among a set of the (last) monitoring period of a monitoring period and a set of symbols to which the DCI format 2_1 belongs. For example, the UE assumes that a signal within a time-frequency resource indicated by preemption is not DL transmission scheduled therefor, and decodes data based on signals reported in the remaining resource region.

massive MTC (mMTC)

Massive machine type communication (mMTC) is one of 5G scenarios for supporting super connection service for simultaneous communication with many UEs. In this environment, a UE intermittently performs communication at a very low transmission speed and mobility. Accordingly, mMTC has a major object regarding how long will be a UE driven how low the cost is. In relation to the mMTC technology, in 3GPP, MTC and NarrowBand (NB)-IoT are handled.

The mMTC technology has characteristics, such as repetition transmission, frequency hopping, retuning, and a guard period for a PDCCH, a PUCCH, a physical downlink shared channel (PDSCH), and a PUSCH.

That is, a PUSCH (or PUCCH (in particular, long PUCCH) or PRACH) including specific information and a PDSCH (or PDCCH) including a response for specific information are repeatedly transmitted. The repetition transmission is performed through frequency hopping. For the repetition transmission, (RF) retuning is performed in a guard period from a first frequency resource to a second frequency resource. Specific information and a response for the specific information may be transmitted/received through a narrowband (e.g., 6 RB (resource block) or 1 RB).

Robot Basic Operation Using 5G Communication

Figure 6:
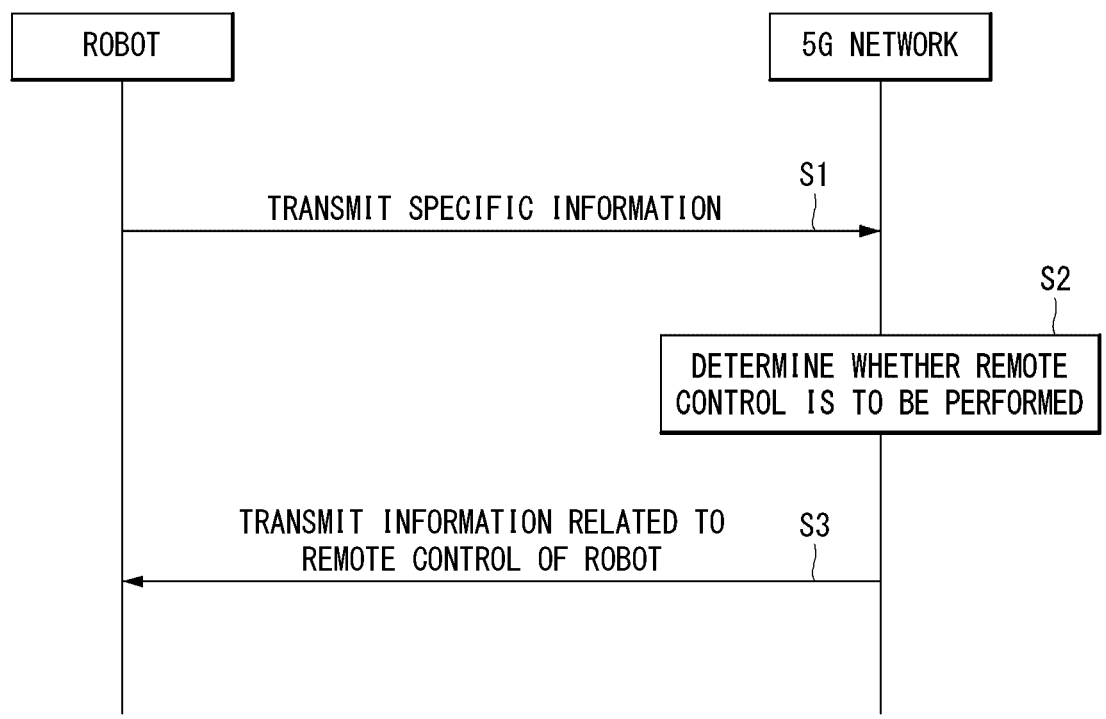
FIG. 6 shows an example of a basic operation of a robot and a 5G network in a 5G communication system.

FIG. 6 shows an example of a basic operation of the robot and a 5G network in a 5G communication system.

A robot transmits specific information transmission to a 5G network (S1). Furthermore, the 5G network may determine whether the robot is remotely controlled (S2). In this case, the 5G network may include a server or module for performing robot-related remote control.

Furthermore, the 5G network may transmit, to the robot, information (or signal) related to the remote control of the robot (S3).

Application Operation Between Robot and 5 G Network in 5 G Communication System

Hereafter, a robot operation using 5 G communication is described more specifically with reference to FIGS. 1 to 6 and the above-described wireless communication technology (BM procedure, URLLC, mMTC).

First, a basic procedure of a method to be proposed later in the present invention and an application operation to which the eMBB technology of 5G communication is applied is described.

As in steps S1 and S3 of FIG. 3, in order for a robot to transmit/receive a signal, information, etc. to/from a 5 G network, the robot performs an initial access procedure and a random access procedure along with a 5 G network prior to step S1 of FIG. 3.

More specifically, in order to obtain DL synchronization and system information, the robot performs an initial access procedure along with the 5 G network based on an SSB. In the initial access procedure, a beam management (BM) process and a beam failure recovery process may be added.

In a process for the robot to receive a signal from the 5G network, a quasi-co location (QCL) relation may be added.

Furthermore, the robot performs a random access procedure along with the 5G network for UL synchronization acquisition and/or UL transmission. Furthermore, the 5G network may transmit an UL grant for scheduling the transmission of specific information to the robot. Accordingly, the robot transmits specific information to the 5G network based on the UL grant. Furthermore, the 5G network transmits, to the robot, a DL grant for scheduling the transmission of a 5G processing result for the specific information. Accordingly, the 5G network may transmit, to the robot, information (or signal) related to remote control based on the DL grant.

A basic procedure of a method to be proposed later in the present invention and an application operation to which the URLLC technology of 5G communication is applied is described below.

As described above, after a robot performs an initial access procedure and/or a random access procedure along with a 5G network, the robot may receive a DownlinkPreemption IE from the 5G network. Furthermore, the robot receives, from the 5G network, DCI format 2_1 including pre-emption indication based on the DownlinkPreemption IE. Furthermore, the robot does not perform (or expect or assume) the reception of eMBB data in a resource (PRB and/or OFDM symbol) indicated by the pre-emption indication. Thereafter, if the robot needs to transmit specific information, it may receive an UL grant from the 5G network.

A basic procedure of a method to be proposed later in the present invention and an application operation to which the mMTC technology of 5G communication is applied is described below.

A portion made different due to the application of the mMTC technology among the steps of FIG. 6 is chiefly described.

In step S1 of FIG. 6, the robot receives an UL grant from the 5G network in order to transmit specific information to the 5G network. In this case, the UL grant includes information on the repetition number of transmission of the specific information. The specific information may be repeatedly transmitted based on the information on the repetition number. That is, the robot transmits specific information to the 5G network based on the UL grant. Furthermore, the repetition transmission of the specific information may be performed through frequency hopping. The transmission of first specific information may be performed in a first frequency resource, and the transmission of second specific information may be performed in a second frequency resource. The specific information may be transmitted through the narrowband of 6 resource blocks (RBs) or 1 RB.

Operation Between Robots Using 5G Communication

Figure 7:
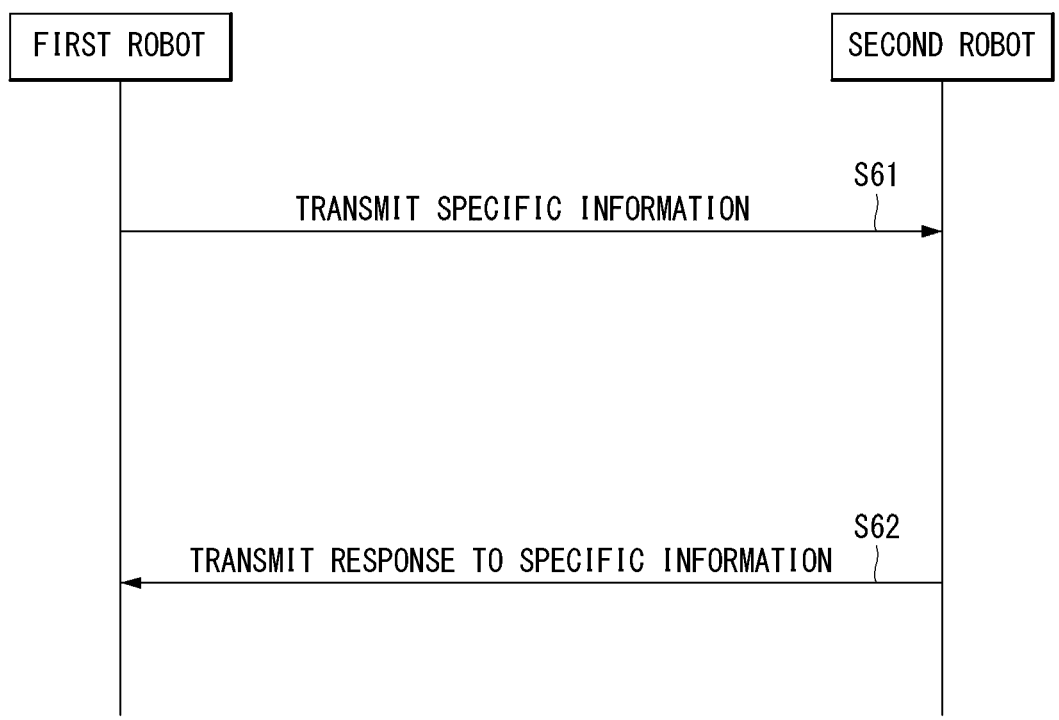
FIG. 7 illustrates an example of a basic operation between robots using 5G communication.

FIG. 7 illustrates an example of a basic operation between robots using 5G communication.

A first robot transmits specific information to a second robot (S61). The second robot transmits, to the first robot, a response to the specific information (S62).

Meanwhile, the configuration of an application operation between robots may be different depending on whether a 5G network is involved directly (sidelink communication transmission mode 3) or indirectly (sidelink communication transmission mode 4) in the specific information, the resource allocation of a response to the specific information.

An application operation between robots using 5G communication is described below.

First, a method for a 5G network to be directly involved in the resource allocation of signal transmission/reception between robots is described.

The 5G network may transmit a DCI format 5A to a first robot for the scheduling of mode 3 transmission (PSCCH and/or PSSCH transmission). In this case, the physical sidelink control channel (PSCCH) is a 5G physical channel for the scheduling of specific information transmission, and the physical sidelink shared channel (PSSCH) is a 5G physical channel for transmitting the specific information. Furthermore, the first robot transmits, to a second robot, an SCI format 1 for the scheduling of specific information transmission on a PSCCH. Furthermore, the first robot transmits specific information to the second robot on the PSSCH.

A method for a 5G network to be indirectly involved in the resource allocation of signal transmission/reception is described below.

A first robot senses a resource for mode 4 transmission in a first window. Furthermore, the first robot selects a resource for mode 4 transmission in a second window based on a result of the sensing. In this case, the first window means a sensing window, and the second window means a selection window. The first robot transmits, to the second robot, an SCI format 1 for the scheduling of specific information transmission on a PSCCH based on the selected resource. Furthermore, the first robot transmits specific information to the second robot on a PSSCH.

The above-described structural characteristic of the unmanned aerial robot, the 5G communication technology, etc. may be combined with methods to be described, proposed in the present inventions, and may be applied or may be supplemented to materialize or clarify the technical characteristics of methods proposed in the present inventions.

Drone

Unmanned aerial system: a combination of a UAV and a UAV controller

Unmanned aerial vehicle: an aircraft that is remotely piloted without a human pilot, and it may be represented as an unmanned aerial robot, a drone, or simply a robot.

UAV controller: device used to control a UAV remotely

ATC: Air Traffic Control

NLOS: Non-line-of-sight

UAS: Unmanned Aerial System

UAV: Unmanned Aerial Vehicle

UCAS: Unmanned Aerial Vehicle Collision Avoidance System

UTM: Unmanned Aerial Vehicle Traffic Management

C2: Command and Control

Figure 8:
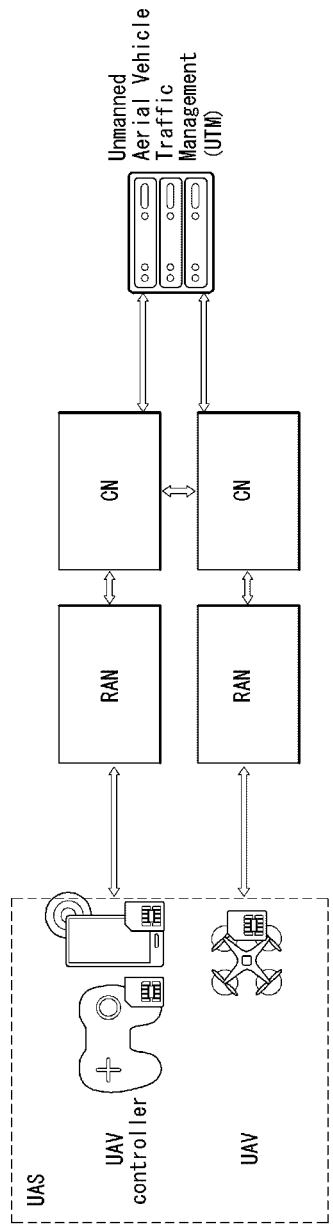
FIG. 8 is a diagram showing an example of the concept diagram of a 3GPP system including a UAS.

FIG. 8 is a diagram showing an example of the concept diagram of a 3GPP system including a UAS.

An unmanned aerial system (UAS) is a combination of an unmanned aerial vehicle (UAV), sometimes called a drone, and a UAV controller. The UAV is an aircraft not including a human pilot device. Instead, the UAV is controlled by a terrestrial operator through a UAV controller, and may have autonomous flight capabilities. A communication system between the UAV and the UAV controller is provided by the 3GPP system. In terms of the size and weight, the range of the UAV is various from a small and light aircraft that is frequently used for recreation purposes to a large and heavy aircraft that may be more suitable for commercial purposes. Regulation requirements are different depending on the range and are different depending on the area.

Communication requirements for a UAS include data uplink and downlink to/from a UAS component for both a serving 3GPP network and a network server, in addition to a command and control (C2) between a UAV and a UAV controller. Unmanned aerial system traffic management (UTM) is used to provide UAS identification, tracking, authorization, enhancement and the regulation of UAS operations and to store data necessary for a UAS for an operation. Furthermore, the UTM enables a certified user (e.g., air traffic control, public safety agency) to query an identity (ID), the meta data of a UAV, and the controller of the UAV.

The 3GPP system enables UTM to connect a UAV and a UAV controller so that the UAV and the UAV controller are identified as a UAS. The 3GPP system enables the UAS to transmit, to the UTM, UAV data that may include the following control information.

Control information: a unique identity (this may be a 3GPP identity), UE capability, manufacturer and model, serial number, take-off weight, location, owner identity, owner address, owner contact point detailed information, owner certification, take-off location, mission type, route data, an operating status of a UAV.

The 3GPP system enables a UAS to transmit UAV controller data to UTM. Furthermore, the UAV controller data may include a unique ID (this may be a 3GPP ID), the UE function, location, owner ID, owner address, owner contact point detailed information, owner certification, UAV operator identity confirmation, UAV operator license, UAV operator certification, UAV pilot identity, UAV pilot license, UAV pilot certification and flight plan of a UAV controller.

The functions of a 3GPP system related to a UAS may be summarized as follows.

- A 3GPP system enables the UAS to transmit different UAS data to UTM based on different certification and an authority level applied to the UAS.
- A 3GPP system supports a function of expanding UAS data transmitted to UTM along with future UTM and the evolution of a support application.
- A 3GPP system enables the UAS to transmit an identifier, such as international mobile equipment identity (IMEI), a mobile station international subscriber directory number (MSISDN) or an international mobile subscriber identity (IMSI) or IP address, to UTM based on regulations and security protection.
- A 3GPP system enables the UE of a UAS to transmit an identity, such as an IMEI, MSISDN or IMSI or IP address, to UTM.
- A 3GPP system enables a mobile network operator (MNO) to supplement data transmitted to UTM, along with network-based location information of a UAV and a UAV controller.
- A 3GPP system enables MNO to be notified of a result of permission so that UTM operates.
- A 3GPP system enables MNO to permit a UAS certification request only when proper subscription information is present.
- A 3GPP system provides the ID(s) of a UAS to UTM.
- A 3GPP system enables a UAS to update UTM with live location information of a UAV and a UAV controller.
- A 3GPP system provides UTM with supplement location information of a UAV and a UAV controller.
- A 3GPP system supports UAVs, and corresponding UAV controllers are connected to other PLMNs at the same time.
- A 3GPP system provides a function for enabling the corresponding system to obtain UAS information on the support of a 3GPP communication capability designed for a UAS operation.

A 3GPP system supports UAS identification and subscription data capable of distinguishing between a UAS having a UAS capable UE and a USA having a non-UAS capable UE.

A 3GPP system supports detection, identification, and the reporting of a problematic UAV(s) and UAV controller to UTM.

In the service requirement of Rel-16 ID UAS, the UAS is driven by a human operator using a UAV controller in order to control paired UAVs. Both the UAVs and the UAV controller are connected using two individual connections over a 3GPP network for a command and control (C2) communication. The first contents to be taken into consideration with respect to a UAS operation include a mid-air collision danger with another UAV, a UAV control failure danger, an intended UAV misuse danger and various dangers of a user (e.g., business in which the air is shared, leisure activities). Accordingly, in order to avoid a danger in safety, if a 5G network is considered as a transmission network, it is important to provide a UAS service by QoS guarantee for C2 communication.

Figure 9:
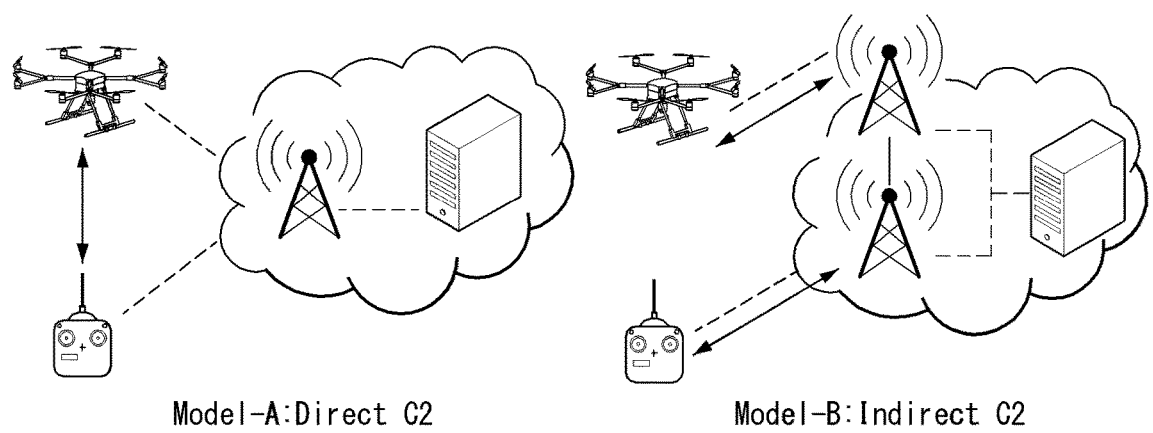
FIG. 9 shows examples of a C2 communication model for a UAV.

FIG. 9 shows examples of a C2 communication model for a UAV.

Model-A is direct C2. A UAV controller and a UAV directly configure a C2 link (or C2 communication) in order to communicate with each other, and are registered with a 5G network using a wireless resource that is provided, configured and scheduled by the 5G network, for direct C2 communication. Model-B is indirect C2. A UAV controller and a UAV establish and register respective unicast C2 communication links for a 5G network, and communicate with each other over the 5G network. Furthermore, the UAV controller and the UAV may be registered with the 5G network through different NG-RAN nodes. The 5G network supports a mechanism for processing the stable routing of C2 communication in any cases. A command and control use C2 communication for forwarding from the UAV controller/UTM to the UAV. C2 communication of this type (model-B) includes two different lower classes for incorporating a different distance between the UAV and the UAV controller/UTM, including a line of sight (VLOS) and a non-line of sight (non-VLOS). Latency of this VLOS traffic type needs to take into consideration a command delivery time, a human response time, and an assistant medium, for example, video streaming, the indication of a transmission waiting time. Accordingly, sustainable latency of the VLOS is shorter than that of the Non-VLOS. A 5G network configures each session for a UAV and a UAV controller. This session communicates with UTM, and may be used for default C2 communication with a UAS.

As part of a registration procedure or service request procedure, a UAV and a UAV controller request a UAS operation from UTM, and provide a pre-defined service class or requested UAS service (e.g., navigational assistance service, weather), identified by an application ID(s), to the UTM. The UTM permits the UAS operation for the UAV and the UAV controller, provides an assigned UAS service, and allocates a temporary UAS-ID to the UAS. The UTM provides a 5G network with information necessary for the C2 communication of the UAS. For example, the information may include a service class, the traffic type of UAS service, requested QoS of the permitted UAS service, and the subscription of the UAS service. When a request to establish C2 communication with the 5G network is made, the UAV and the UAV controller indicate a preferred C2 communication model (e.g., model-B) along with the UAS-ID allocated to the 5G network. If an additional C2 communication connection is to be generated or the configuration of the existing data connection for C2 needs to be changed, the 5G network modifies or allocates one or more QoS flows for C2 communication traffic based on requested QoS and priority in the approved UAS service information and C2 communication of the UAS.

UAV Traffic Management (1) Centralized UAV Traffic Management

A 3GPP system provides a mechanism that enables UTM to provide a UAV with route data along with flight permission. The 3GPP system forwards, to a UAS, route modification information received from the UTM with latency of less than 500 ms. The 3GPP system needs to forward notification, received from the UTM, to a UAV controller having a waiting time of less than 500 ms.

(2) De-Centralized UAV Traffic Management

A 3GPP system broadcasts the following data (e.g., if it is requested based on another regulation requirement, UAV identities, UAV type, a current location and time, flight route information, current velocity, operation state) so that a UAV identifies a UAV(s) in a short-distance area for collision avoidance.

A 3GPP system supports a UAV in order to transmit a message through a network connection for identification between different UAVs. The UAV preserves owner's personal information of a UAV, UAV pilot and UAV operator in the broadcasting of identity information.

A 3GPP system enables a UAV to receive local broadcasting communication transmission service from another UAV in a short distance.

A UAV may use direct UAV versus UAV local broadcast communication transmission service in or out of coverage of a 3GPP network, and may use the direct UAV versus UAV local broadcast communication transmission service if transmission/reception UAVs are served by the same or different PLMNs.

A 3GPP system supports the direct UAV versus UAV local broadcast communication transmission service at a relative velocity of a maximum of 320 kmph. The 3GPP system supports the direct UAV versus UAV local broadcast communication transmission service having various types of message payload of 50-1500 bytes other than security-related message elements.

A 3GPP system supports the direct UAV versus UAV local broadcast communication transmission service capable of guaranteeing separation between UAVs. In this case, the UAVs may be considered to have been separated if they are in a horizontal distance of at least 50 m or a vertical distance of 30 m or both. The 3GPP system supports the direct UAV versus UAV local broadcast communication transmission service that supports the range of a maximum of 600 m.

A 3GPP system supports the direct UAV versus UAV local broadcast communication transmission service capable of transmitting a message with frequency of at least 10 message per second, and supports the direct UAV versus UAV local broadcast communication transmission service capable of transmitting a message whose inter-terminal waiting time is a maximum of 100 ms.

A UAV may broadcast its own identity locally at least once per second, and may locally broadcast its own identity up to a 500 m range.

Security

A 3GPP system protects data transmission between a UAS and UTM. The 3GPP system provides protection against the spoofing attack of a UAS ID. The 3GPP system permits the non-repudiation of data, transmitted between the UAS and the UTM, in the application layer. The 3GPP system supports the integrity of a different level and the capability capable of providing a personal information protection function with respect to a different connection between the UAS and the UTM, in addition to data transmitted through a UAS and UTM connection. The 3GPP system supports the classified protection of an identity and personal identification information related to the UAS. The 3GPP system supports regulation requirements (e.g., lawful intercept) for UAS traffic.

When a UAS requests the authority capable of accessing UAS data service from an MNO, the MNO performs secondary check (after initial mutual certification or simultaneously with it) in order to establish UAS qualification verification to operate. The MNO is responsible for transmitting and potentially adding additional data to the request so that the UAS operates as unmanned aerial system traffic management (UTM). In this case, the UTM is a 3GPP entity. The UTM is responsible for the approval of the UAS that operates and identifies the qualification verification of the UAS and the UAV operator. One option is that the UTM is managed by an aerial traffic control center. The aerial traffic control center stores all data related to the UAV, the UAV controller, and live location. When the UAS fails in any part of the check, the MNO may reject service for the UAS and thus may reject operation permission.

3GPP Support for Aerial UE (or Drone) Communication

An E-UTRAN-based mechanism that provides an LTE connection to a UE capable of aerial communication is supported through the following functions.

Subscription-based aerial UE identification and authorization defined in Section TS 23.401, 4.3.31.

Height reporting based on an event in which the altitude of a UE exceeds a reference altitude threshold configured with a network.

Interference detection based on measurement reporting triggered when the number of configured cells (i.e., greater than 1) satisfies a triggering criterion at the same time.

Signaling of flight route information from a UE to an E-UTRAN.

Location information reporting including the horizontal and vertical velocity of a UE.

(1) Subscription-Based Identification of Aerial UE Function

The support of the aerial UE function is stored in user subscription information of an HSS. The HSS transmits the information to an MME in an Attach, Service Request and Tracking Area Update process. The subscription information may be provided from the MME to a base station through an S1 AP initial context setup request during the Attach, tracking area update and service request procedure. Furthermore, in the case of X2-based handover, a source base station (BS) may include subscription information in an X2-AP Handover Request message toward a target BS. More detailed contents are described later. With respect to intra and inter MME S1-based handover, the MME provides subscription information to the target BS after the handover procedure.

(2) Height-Based Reporting for Aerial UE Communication

An aerial UE may be configured with event-based height reporting. The aerial UE transmits height reporting when the altitude of the UE is higher or lower than a set threshold. The reporting includes height and a location.

(3) Interference Detection and Mitigation for Aerial UE Communication

For interference detection, when each (per cell) RSRP value for the number of configured cells satisfies a configured event, an aerial UE may be configured with an RRM event A3, A4 or A5 that triggers measurement reporting. The reporting includes an RRM result and location. For interference mitigation, the aerial UE may be configured with a dedicated UE-specific alpha parameter for PUSCH power control.

(4) Flight Route Information Reporting

An E-UTRAN may request a UE to report flight route information configured with a plurality of middle points defined as 3D locations, as defined in TS 36.355. If the flight route information is available for the UE, the UE reports a waypoint for a configured number. The reporting may also include a time stamp per waypoint if it is configured in the request and available for the UE.

(5) Location Reporting for Aerial UE Communication

Location information for aerial UE communication may include a horizontal and vertical velocity if they have been configured. The location information may be included in the RRM reporting and the height reporting.

Hereafter, (1) to (5) of 3GPP support for aerial UE communication is described more specifically.

DL/UL Interference Detection

For DL interference detection, measurements reported by a UE may be useful. UL interference detection may be performed based on measurement in a base station or may be estimated based on measurements reported by a UE. Interference detection can be performed more effectively by improving the existing measurement reporting mechanism. Furthermore, for example, other UE-based information, such as mobility history reporting, speed estimation, a timing advance adjustment value, and location information, may be used by a network in order to help interference detection. More detailed contents of measurement execution are described later.

DL Interference Mitigation

In order to mitigate DL interference in an aerial UE, LTE Release-13 FD-MIMO may be used. Although the density of aerial UEs is high, Rel-13 FD-MIMO may be advantageous in restricting an influence on the DL terrestrial UE throughput, while providing a DL aerial UE throughput that satisfies DL aerial UE throughput requirements. In order to mitigate DL interference in an aerial UE, a directional antenna may be used in the aerial UE. In the case of a high-density aerial UE, a directional antenna in the aerial UE may be advantageous in restricting an influence on a DL terrestrial UE throughput. The DL aerial UE throughput has been improved compared to a case where a non-directional antenna is used in the aerial UE. That is, the directional antenna is used to mitigate interference in the downlink for aerial UEs by reducing interference power from wide angles. In the viewpoint that a LOS direction between an aerial UE and a serving cell is tracked, the following types of capability are taken into consideration:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of an antenna toward a serving cell.

3) Non-ideal LOS: an aerial UE tracks the direction of a serving cell LOS, but has an error due to actual restriction.

In order to mitigate DL interference with aerial UEs, beamforming in aerial UEs may be used. Although the density of aerial UEs is high, beamforming in the aerial UEs may be advantageous in restricting an influence on a DL terrestrial UE throughput and improving a DL aerial UE throughput. In order to mitigate DL interference in an aerial UE, intra-site coherent JT CoMP may be used. Although the density of aerial UEs is high, the intra-site coherent JT can improve the throughput of all UEs. An LTE Release-13 coverage extension technology for non-bandwidth restriction devices may also be used. In order to mitigate DL interference in an aerial UE, a coordinated data and control transmission method may be used. An advantage of the coordinated data and control transmission method is to increase an aerial UE throughput, while restricting an influence on a terrestrial UE throughput. It may include signaling for indicating a dedicated DL resource, an option for cell muting/ABS, a procedure update for cell (re)selection, acquisition for being applied to a coordinated cell, and the cell ID of a coordinated cell.

UL Interference Mitigation

In order to mitigate UL interference caused by aerial UEs, an enhanced power control mechanisms may be used. Although the density of aerial UEs is high, the enhanced power control mechanism may be advantageous in restricting an influence on a UL terrestrial UE throughput.

The above power control-based mechanism influences the following contents.

UE-specific partial pathloss compensation factor
UE-specific Po parameter
Neighbor cell interference control parameter
Closed-loop power control The power control-based mechanism for UL interference mitigation is described more specifically.

1) UE-Specific Partial Pathloss Compensation Factor

The enhancement of the existing open-loop power control mechanism is taken into consideration in the place where a UE-specific partial pathloss compensation factor $\alpha_{UE}$ is introduced. Due to the introduction of the UE-specific partial pathloss compensation factor $\alpha_{UE}$, different $\alpha_{UE}$ may be configured by comparing an aerial UE with a partial pathloss compensation factor configured in a terrestrial UE.

2) UE-Specific PO Parameter

Aerial UEs are configured with different Po compared with Po configured for terrestrial UEs. The enhance of the existing power control mechanism is not necessary because the UE-specific Po is already supported in the existing open-loop power control mechanism.

Furthermore, the UE-specific partial pathloss compensation factor $\alpha_{UE}$ and the UE-specific Po may be used in common for uplink interference mitigation. Accordingly, the UE-specific partial pathloss compensation factor $\alpha_{UE}$ and the UE-specific Po can improve the uplink throughput of a terrestrial UE, while scarifying the reduced uplink throughput of an aerial UE.

3) Closed-Loop Power Control

Target reception power for an aerial UE is coordinated by taking into consideration serving and neighbor cell measurement reporting. Closed-loop power control for aerial UEs needs to handle a potential high-speed signal change in the sky because aerial UEs may be supported by the sidelobes of base station antennas.

In order to mitigate UL interference attributable to an aerial UE, LTE Release-13 FD-MIMO may be used. In order to mitigate UL interference caused by an aerial UE, a UE-directional antenna may be used. In the case of a high-density aerial UE, a UE-directional antenna may be advantageous in restricting an influence on an UL terrestrial UE throughput. That is, the directional UE antenna is used to reduce uplink interference generated by an aerial UE by reducing a wide angle range of uplink signal power from the aerial UE. The following type of capability is taken into consideration in the viewpoint in which an LOS direction between an aerial UE and a serving cell is tracked:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of the antenna toward a serving cell.

3) Non-ideal LOS: an aerial UE tracks the direction of a serving cell LOS, but has an error due to actual restriction.

A UE may align an antenna direction with an LOS direction and amplify power of a useful signal depending on the capability of tracking the direction of an LOS between the aerial UE and a serving cell. Furthermore, UL transmission beamforming may also be used to mitigate UL interference.

Mobility

Mobility performance (e.g., a handover failure, a radio link failure (RLF), handover stop, a time in Qout) of an aerial UE is weakened compared to a terrestrial UE. It is expected that the above-described DL and UL interference mitigation technologies may improve mobility performance for an aerial UE. Better mobility performance in a rural area network than in an urban area network is monitored. Furthermore, the existing handover procedure may be improved to improve mobility performance.

Improvement of a handover procedure for an aerial UE and/or mobility of a handover-related parameter based on location information and information, such as the aerial state of a UE and a flight route plan A measurement reporting mechanism may be improved in such a way as to define a new event, enhance a trigger condition, and control the quantity of measurement reporting.

The existing mobility enhancement mechanism (e.g., mobility history reporting, mobility state estimation, UE support information) operates for an aerial UE and may be first evaluated if additional improvement is necessary. A parameter related to a handover procedure for an aerial UE may be improved based on aerial state and location information of the UE. The existing measurement reporting mechanism may be improved by defining a new event, enhancing a triggering condition, and controlling the quantity of measurement reporting. Flight route plan information may be used for mobility enhancement.

A measurement execution method which may be applied to an aerial UE is described more specifically.

Figure 10:
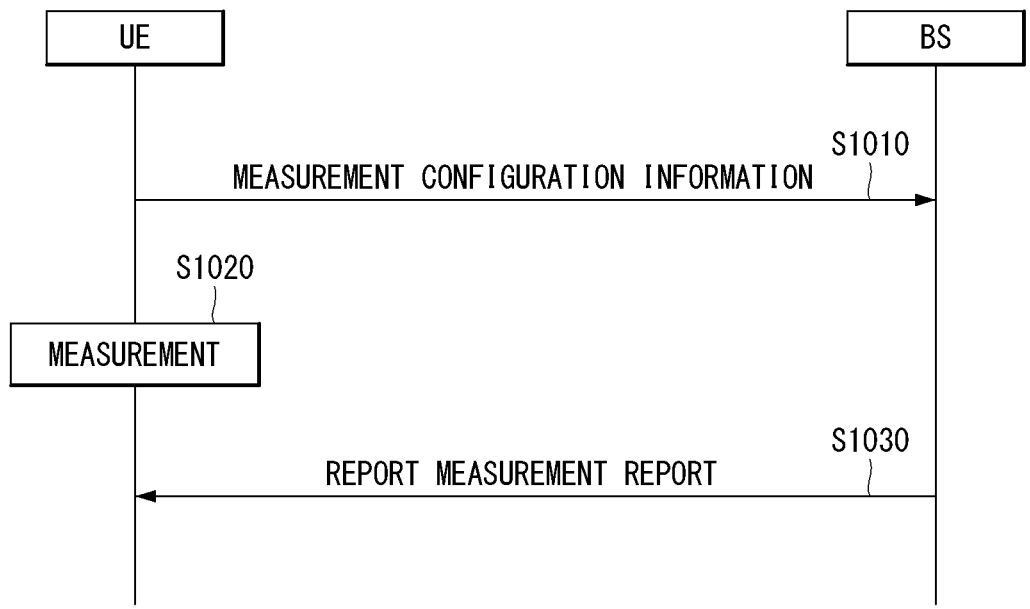
FIG. 10 is a flowchart showing an example of a measurement execution method to which the present invention is applicable.

FIG. 10 is a flowchart showing an example of a measurement execution method to which the present invention may be applied.

An aerial UE receives measurement configuration information from a base station (S1010). In this case, a message including the measurement configuration information is called a measurement configuration message. The aerial UE performs measurement based on the measurement configuration information (S1020). If a measurement result satisfies a reporting condition within the measurement configuration information, the aerial UE reports the measurement result to the base station (S1030). A message including the measurement result is called a measurement report message. The measurement configuration information may include the following information.

(1) Measurement object information: this is information on an object on which an aerial UE will perform measurement. The measurement object includes at least one of an intra-frequency measurement object that is an object of measurement within a cell, an inter-frequency measurement object that is an object of inter-cell measurement, or an inter-RAT measurement object that is an object of inter-RAT measurement. For example, the intra-frequency measurement object may indicate a neighbor cell having the same frequency band as a serving cell. The inter-frequency measurement object may indicate a neighbor cell having a frequency band different from that of a serving cell. The inter-RAT measurement object may indicate a neighbor cell of an RAT different from the RAT of a serving cell.

(2) Reporting configuration information: this is information on a reporting condition and reporting type regarding when an aerial UE reports the transmission of a measurement result. The reporting configuration information may be configured with a list of reporting configurations. Each reporting configuration may include a reporting criterion and a reporting format. The reporting criterion is a level in which the transmission of a measurement result by a UE is triggered. The reporting criterion may be the periodicity of measurement reporting or a single event for measurement reporting. The reporting format is information regarding that an aerial UE will configure a measurement result in which type.

An event related to an aerial UE includes (i) an event H1 and (ii) an event H2.

Event H1 (Aerial UE Height Exceeding a Threshold)

A UE considers that an entering condition for the event is satisfied when 1) the following defined condition H1-1 is satisfied, and considers that a leaving condition for the event is satisfied when 2) the following defined condition H1-2 is satisfied.

Inequality H1-1 (entering condition): Ms−Hys>Thresh+Offset

Inequality H1-2 (leaving condition): Ms+Hys<Thresh+Offset

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h1-ThresholdOffset defined in ReportConfigEUTRA). Ms is indicated in meters. Thresh is represented in the same unit as Ms.

Event H2 (Aerial UE Height of Less than Threshold)

A UE considers that an entering condition for an event is satisfied 1) the following defined condition H2-1 is satisfied, and considers that a leaving condition for the event is satisfied 2) when the following defined condition H2-2 is satisfied.

Inequality H2-1 (entering condition): Ms+Hys<Thresh+Offset

Inequality H2-2 (leaving condition): Ms−Hys>Thresh+Offset

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h2-ThresholdOffset defined in ReportConfigEUTRA). Ms is indicated in meters. Thresh is represented in the same unit as Ms.

(3) Measurement identity information: this is information on a measurement identity by which an aerial UE determines to report which measurement object using which type by associating the measurement object and a reporting configuration. The measurement identity information is included in a measurement report message, and may indicate that a measurement result is related to which measurement object and that measurement reporting has occurred according to which reporting condition.

(4) Quantity configuration information: this is information on a parameter for configuring filtering of a measurement unit, a reporting unit and/or a measurement result value.

(5) Measurement gap information: this is information on a measurement gap, that is, an interval which may be used by an aerial UE in order to perform only measurement without taking into consideration data transmission with a serving cell because downlink transmission or uplink transmission has not been scheduled in the aerial UE.

In order to perform a measurement procedure, an aerial UE has a measurement object list, a measurement reporting configuration list, and a measurement identity list. If a measurement result of the aerial UE satisfies a configured event, the UE transmits a measurement report message to a base station.

In this case, the following parameters may be included in a UE-EUTRA-Capability Information Element in relation to the measurement reporting of the aerial UE. IE UE-EUTRA-Capability is used to forward, to a network, an E-RA UE Radio Access Capability parameter and a function group indicator for an essential function. IE UE-EUTRA-Capability is transmitted in an E-UTRA or another RAT. Table 1 is a table showing an example of the UE-EUTRA-Capability IE.

TABLE 1

-- ASN1START..... MeasParameters-v1530 ::= SEQUENCE {qoe-MeasReport-r15
ENUMERATED {supported} OPTIONAL, qoe-MTSI-MeasReport-r15
ENUMERATED {supported} OPTIONAL, ca-IdleModeMeasurements-r15
ENUMERATED {supported} OPTIONAL, ca-IdleModeValidityArea-r15
ENUMERATED {supported} OPTIONAL, heightMeas-r15 ENUMERATED {supported}
    OPTIONAL, multipleCellsMeasExtension-r15    ENUMERATED {supported}
    OPTIONAL}.....

The heightMeas-r15 field defines whether a UE supports height-based measurement reporting defined in TS 36.331. As defined in TS 23.401, to support this function with respect to a UE having aerial UE subscription is essential. The multipleCellsMeasExtension-r15 field defines whether a UE supports measurement reporting triggered based on a plurality of cells. As defined in TS 23.401, to support this function with respect to a UE having aerial UE subscription is essential.

UAV UE Identification

A UE may indicate a radio capability in a network which may be used to identify a UE having a related function for supporting a UAV-related function in an LTE network. A permission that enables a UE to function as an aerial UE in the 3GPP network may be aware based on subscription information transmitted from the MME to the RAN through S1 signaling. Actual "aerial use" certification/license/restriction of a UE and a method of incorporating it into subscription information may be provided from a Non-3GPP node to a 3GPP node. A UE in flight may be identified using UE-based reporting (e.g., mode indication, altitude or location information during flight, an enhanced measurement reporting mechanism (e.g., the introduction of a new event) or based on mobility history information available in a network.

Subscription Handling for Aerial UE

The following description relates to subscription information processing for supporting an aerial UE function through the E-UTRAN defined in TS 36.300 and TS 36.331. An eNB supporting aerial UE function handling uses information for each user, provided by the MME, in order to determine whether the UE can use the aerial UE function. The support of the aerial UE function is stored in subscription information of a user in the HSS. The HSS transmits the information to the MME through a location update message during an attach and tracking area update procedure. A home operator may cancel the subscription approval of the user for operating the aerial UE at any time. The MME supporting the aerial UE function provides the eNB with subscription information of the user for aerial UE approval through an S1 AP initial context setup request during the attach, tracking area update and service request procedure.

An object of an initial context configuration procedure is to establish all required initial UE context, including E-RAB context, a security key, a handover restriction list, a UE radio function, and a UE security function. The procedure uses UE-related signaling.

In the case of Inter-RAT handover to intra- and inter-MME S1 handover (intra RAT) or E-UTRAN, aerial UE subscription information of a user includes an S1-AP UE context modification request message transmitted to a target BS after a handover procedure.

An object of a UE context change procedure is to partially change UE context configured as a security key or a subscriber profile ID for RAT/frequency priority, for example. The procedure uses UE-related signaling.

In the case of X2-based handover, aerial UE subscription information of a user is transmitted to a target BS as follows:
- If a source BS supports the aerial UE function and aerial UE subscription information of a user is included in UE context, the source BS includes corresponding information in the X2-AP handover request message of a target BS.
- An MME transmits, to the target BS, the aerial UE subscription information in a Path Switch Request Acknowledge message.

An object of a handover resource allocation procedure is to secure, by a target BS, a resource for the handover of a UE.

If aerial UE subscription information is changed, updated aerial UE subscription information is included in an S1-AP UE context modification request message transmitted to a BS.

Table 2 is a table showing an example of the aerial UE subscription information.

TABLE 2

| IE/Group Name | Presence | Range | IE type and reference |
| --- | --- | --- | --- |
| Aerial UE subscription information | M | | ENUMERATED (allowed, not allowed, . . .) |

Aerial UE subscription information is used by a BS in order to know whether a UE can use the aerial UE function.

Combination of Drone and eMBB

A 3GPP system can support data transmission for a UAV (aerial UE or drone) and for an eMBB user at the same time.

A base station may need to support data transmission for an aerial UAV and a terrestrial eMBB user at the same time under a restricted bandwidth resource. For example, in a live broadcasting scenario, a UAV of 100 meters or more requires a high transmission speed and a wide bandwidth because it has to transmit, to a base station, a captured figure or video in real time. At the same time, the base station needs to provide a requested data rate to terrestrial users (e.g., eMBB users). Furthermore, interference between the two types of communications needs to be minimized.

In recent years, a drone is used for a variety of uses and may be used for more variety of uses (for example, delivery, detection, patrol, and the like) in the future. An expensive sensor may be mounted in a commercial drone, and in a case where the drone with the expensive sensor is crashed, a serious property damage may occur.

However, since the sufficient recognitions and precautions against a crash of the drone are not currently prepared and flight time of the drone is also limited to a fixed time (for example, 2 to 30 minutes) due to a capacity limitation of a battery of the drone, when the battery is dead during flight, the drone may be crashed and damaged.

In addition, a hybrid engine for increasing the flight duration of the drone is inconvenient in charging and has a low efficiency.

In order to solve such problems, the present invention proposes a method for increasing a flight duration and preventing a crash by providing a parachute in a main body of a drone and deploying the parachute from the drone in emergency.

Figure 11:
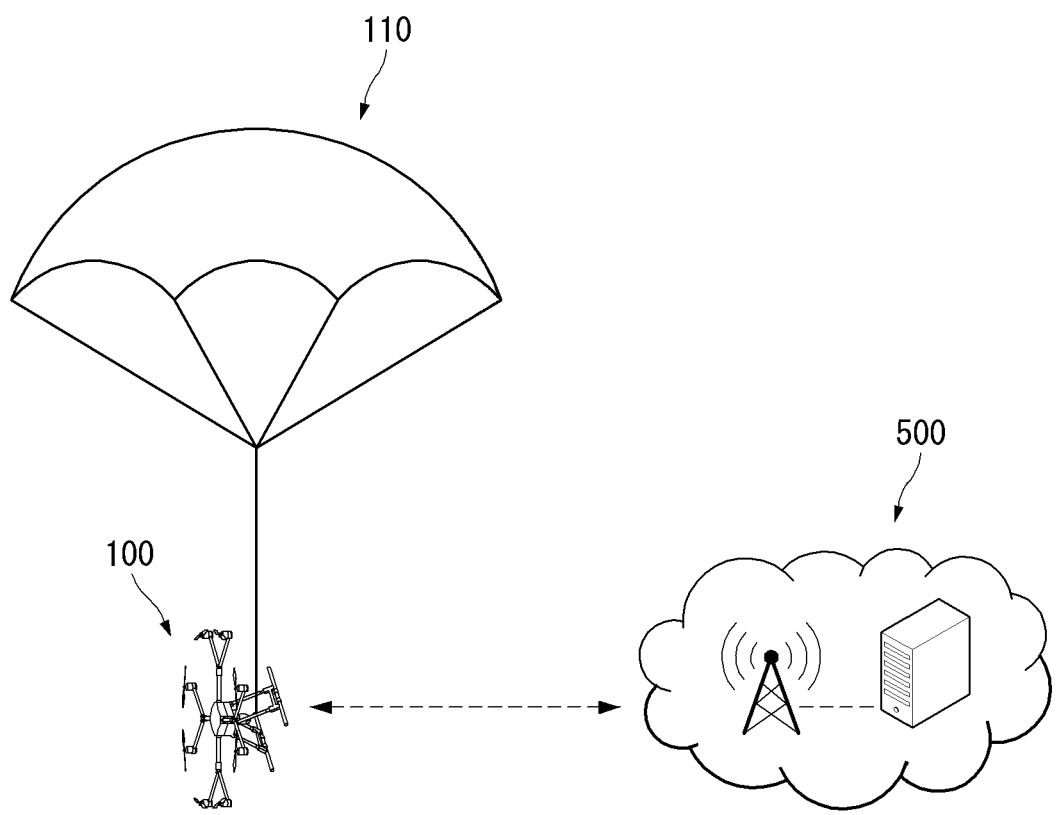
FIG. 11 is a diagram illustrating an example of a structure of a system for controlling flight of an unmanned aerial robot according to an embodiment of the present invention.

FIG. 11 is a diagram illustrating an example of a structure of a system for controlling flight of a drone according to an embodiment of the present invention.

Referring to FIG. 11, a flight control system for increasing a flight duration of a drone and preventing a crash of the drone may include a drone 100, a parachute 110 provided in the drone 100, and a control center (or base station) 500 for controlling flight of the drone 100.

The drone 100 may include a main body in which the parachute 110 is provided and a control device which allows deployment of the parachute 110 in the main body. The control device may be attached and detached to and from the main body of the drone 100. One or more propellers of the drone 100 may each include a tilt motor to increase the flight duration of the drone 100 and/or a stationary motor propelled in a reverse direction to balance with the parachute 110 and change a moving direction of the parachute 110.

When a specific condition is satisfied, the drone 100 may deploy the parachute 110 in order to increase a flight duration and/or decrease a falling speed of the drone.

At this time, the drone 100 may be in one condition among the following specific conditions.

- A case where a moving distance calculated based on a current speed of the drone 100 and a remaining amount of a battery is smaller than a distance to a destination
- A case where a flight duration of the drone is required to be increased (for example, a case where since flight is required to be longer than a preset flight operation, a battery capacity is required more than a remaining amount of a battery)
- A case where a control message instructing deployment of the parachute is received from a control center
- A case where an altitude of the drone is rapidly decreased or a case where it is determined that the drone is falling when a falling speed of the drone is greater than a threshold value
- When the drone is falling, a case where an altitude of the drone is equal to or less than a threshold value indicating a minimum altitude at which breakage of the drone may be prevented The one or more propellers may be stopped by interrupting an operation of each of one or more motors connected to each of the one or more propellers in order to prevent a collision with the one or more propellers when the parachute 110 is deployed from the drone 100.

After the deployment of the parachute 110 from the drone 100, when the amount of altitude change (Δz) represented as a clime rate is equal to or less than a specific threshold value (for example, about 0.6 m/s) and is equal to or less than a certain range (0.5 to 0.7 m/s), the one or more motors may be operated again to rotate the one or more propellers.

That is, after the deployment of the parachute 110 from the drone 100, when the amount of altitude change is stable, the propeller may be rotated again.

In this case, when the parachute 110 is deployed from the drone 100 and the one or more propellers are rotated again, a rotation speed of each of the one or more propellers may be adjusted so that the drone 100 is positioned perpendicular to the parachute 110.

After the deployment of the parachute 110 from the drone 100, flight of the drone 100 may be controlled by adjusting the rotation speed of each of the one or more propellers.

Specifically, after the deployment of the parachute 110 from the drone 100, the rotation speed of each of the one or more propellers may be controlled in order to prevent a crush of the drone 100 due to a collision between the parachute 110 and the one or more propellers or to control a flight direction and/or speed of the drone 100.

At this time, a propeller closest to the parachute 110 may be stopped while the parachute 110 is deployed in order to prevent line twist due to a collision with a line connecting the parachute 110 and the drone 100.

For example, in a case where an angle or a distance between the parachute 110 and the drone 100 is measured, when the angle is equal to or greater than a threshold value or the distance is less than a threshold value, the rotation speed of each of the one or more propellers is increased and the speeds of some propellers are decreased or some propellers are reversed, such that the collision between the drone 100 and the parachute 110 may be prevented.

In this case, the threshold value may mean a minimum angle between the parachute 110 and the drone 100 for preventing a collision between the one or more propellers and the parachute 110 or may mean a minimum distance between the parachute and the drone for preventing the collision between the one or more propellers and the parachute.

Alternatively, in a case where a speed of each of the parachute 110 and the drone 100 is calculated by a sensor, when the speed (first speed) of the drone 100 is faster than the speed (second speed) of the parachute 110, the collision between the drone 100 and the parachute 110 may be prevented by decreasing the speed of the drone 100.

In a case where the drone 100 has reached a destination or returned to an originating point, the drone 100 may attempt to land. In this case, the drone 100 is required to attempt to land in a state in which the parachute 110 is unfolded. Accordingly, it is possible to maximize rotation speeds of propellers positioned in a lower portion of the drone 100 until the drone 100 is parallel to the ground in order to prevent breakage of the drone 100 due to inclined landing.

Alternatively, in order to prevent a crash of the drone 100 due to the twist of the line connecting the parachute 110 and the drone 100, when landing of the drone, the parachute 110 is detached from the main body of the drone 100, and the rotation speeds of the propellers positioned in the lower portion of the drone 100 are maximized, such that the drone 100 may be controlled to be parallel to the ground.

At this time, the parachute 110 may be detached from the drone 100 by a method in which a fastening portion connected to the main body of the drone 100 is open, or the like.

The control center 500 may transmit to the drone 100 a control signal for controlling a movement of the drone 100 or instruction information for instructing a specific operation, and may receive state information indicating a current state of the drone 100 from the drone 100.

At this time, the state information may include information related to an altitude, a speed, the amount of altitude change, a failure state, a remaining amount of a battery, and/or a location of the drone.

The control center 500 may calculate a distance in which the drone 100 can move and a distance to a destination based on the state information of the drone 100. The control center 500 may directly transmit the calculated value to the drone, or in a case where it is determined that the drone is difficult to reach the destination based on the calculated value, the control center 500 may transmit to the drone 100 an instruction message instructing deployment of the parachute 110.

In addition, in a case where it is determined that the drone 100 cannot complete a preset duty based on the state information of the drone 100, the control center 500 may transmit to the drone 100 an instruction message instructing returning of the drone or landing to a near station.

When the instruction message instructing the specific operation is received from the base station, the drone 100 may perform the instructed specific operation.

By such a method, the flight duration and the moving distance of the drone may be increased and the flight of the drone may be controlled to prevent the crash of the drone.

Figure 12:
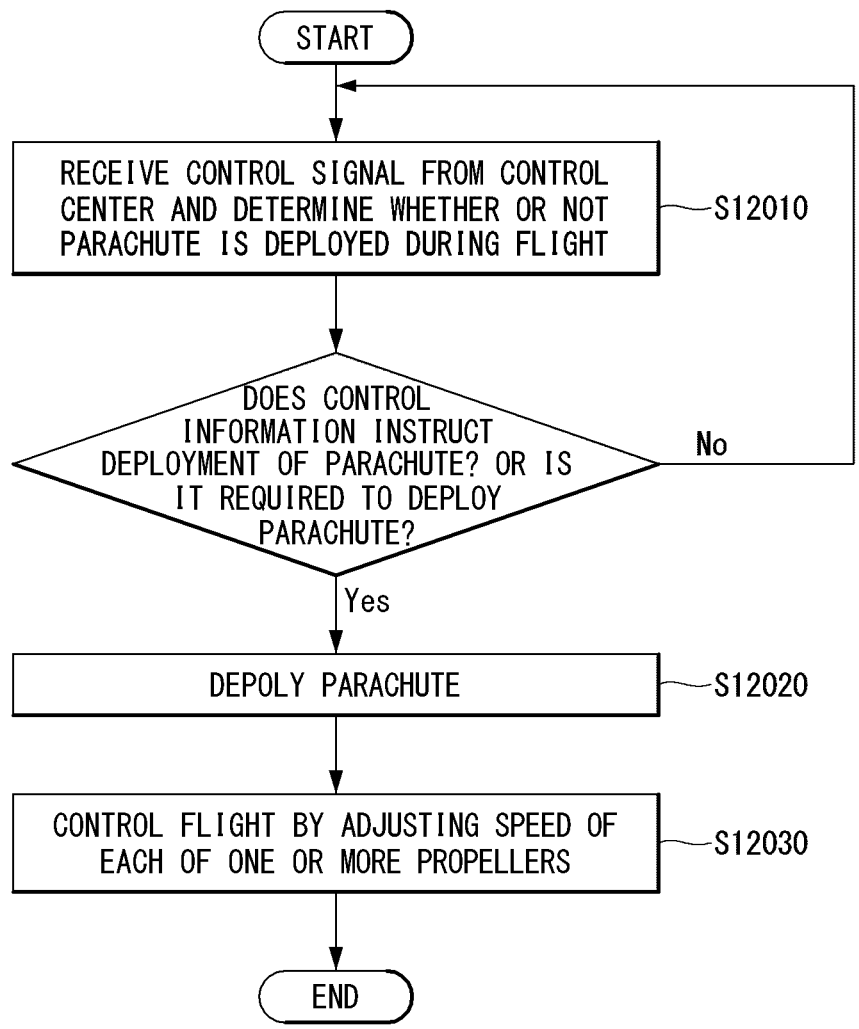
FIG. 12 is a flowchart illustrating an example of a method for controlling flight of an unmanned aerial robot according to an embodiment of the present invention.

FIG. 12 is a flowchart illustrating an example of a method for controlling flight of a drone according to an embodiment of the present invention.

Referring to FIG. 12, in a case where the specific condition is satisfied, the drone may deploy the parachute in order to increase the flight duration and the moving distance.

Specifically, the drone may receive control information from the control center or determine whether or not the parachute is deployed (S12010).

In this case, as described in FIG. 11, when the control information instructs deployment of the parachute or it is determined that the deployment of the parachute is required due to satisfaction of the specific condition other than reception of the control information, the drone may deploy the parachute in order to increase the flight duration and/or to decrease the falling speed of the drone (S12020).

The specific condition may be the following conditions as described in FIG. 11, in a case where the following condition is satisfied even though the drone does not receive the control information from the base station, the drone may deploy the parachute.

- A case where a moving distance calculated based on a current speed of the drone and a remaining amount of a battery is smaller than a distance to a destination
- A case where a flight duration of the drone is required to be increased (for example, a case where since flight is required to be longer than a preset flight operation, a battery capacity is required more than a remaining amount of a battery)
- A case where an altitude of the drone is rapidly decreased or a case where it is determined that the drone is falling when a falling speed of the drone is greater than a threshold value
- When the drone is falling, a case where an altitude of the drone is equal to or less than a threshold value indicating a minimum altitude at which breakage of the drone may be prevented For example, an expected flight distance may be calculated based on a current remaining amount of a battery, a comparison of the calculated expected flight distance with a flight distance to a destination is performed, and when the calculated expected flight distance is smaller than the flight distance to the destination, the drone may deploy the parachute.

At this time, the parachute is deployed toward an area beside the drone in order to prevent entanglement with the one or more propellers of the drone, and the operation of the one or more motors connected to the one or more propellers may be interrupted in order to stop the rotation of each of the one or more propellers while the parachute is deployed.

After the deployment of the parachute from the drone, the flight of the drone such as a flight speed, a direction, a location of the drone may be controlled by adjusting the speed of each of the one or more propellers (S12030).

Specifically, after deployment of the parachute from the drone, when the amount of altitude change ($\Delta z$) described in FIG. 11 is equal to or less than a specific threshold value (for example, about 0.6 m/s) and is equal to or less than a certain range (0.5 to 0.7 m/s), the one or more motors may be operated again to rotate the one or more propellers.

That is, after the deployment of the parachute from the drone, when the amount of altitude change is stable, the propeller may be rotated again.

In this case, when the parachute is deployed from the drone and the one or more propellers are rotated again, the rotation speed of each of the one or more propellers may be adjusted so that the drone is positioned perpendicular to the parachute.

In addition, in order to prevent the collision between the one or more propellers and the parachute, change a direction of the drone, or change a speed of the drone, the flight of the drone may be controlled by increasing or decreasing a rotation speed of each of the propellers positioned in an upper portion, a middle portion, and a lower portion of the drone, among the one or more propellers.

By using such a method, the crash of the drone may be prevented and the moving direction of the drone may be controlled even in a case where the drone deploys the parachute in order to increase the flight duration and the moving distance.

Figure 13:
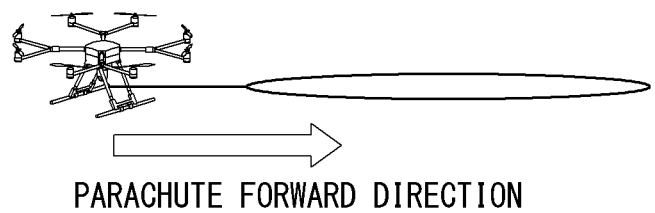
FIGS. 13A and 13B are diagrams illustrating an example of a method of deploying a parachute of an unmanned aerial robot according to an embodiment of the present invention.
Figure 13:
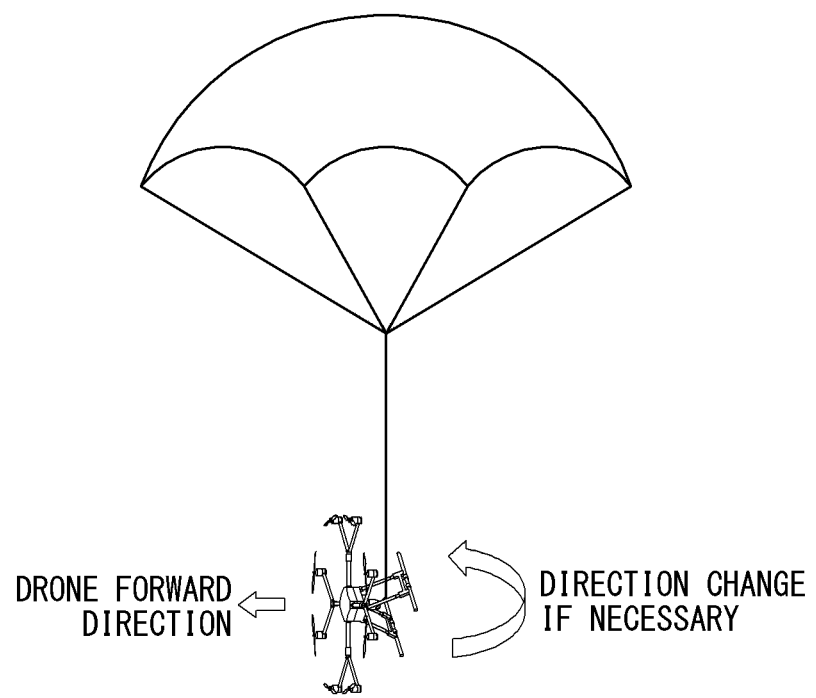

FIGS. 13A and 13B are diagrams illustrating an example of a method of deploying a parachute of a drone according to an embodiment of the present invention.

Referring to FIG. 13A, the drone may deploy the parachute toward an area beside the drone in order to prevent entanglement with the propeller when the parachute is deployed.

That is, in the case where the drone deploys the parachute in order to increase the flight duration and the moving distance, when the parachute is deployed upwards, the parachute may not be normally deployed or may be entangled with the propeller due to a collision with the propeller or the like.

Accordingly, for safe deployment of the parachute from the drone, the operation of the motor connected to the propeller may be interrupted immediately before the deployment of the parachute in order to stop the operation of the propeller.

In addition, by deploying the parachute toward the area beside the drone instead of deploying upwards, such that it is possible to deploy the parachute safely without the collision between the drone and the propeller.

After the deployment of the parachute from the drone, when the amount of altitude change is stable, the moving direction of the drone may be controlled by rotating the one or more propellers again, as illustrated in FIG. 13B.

That is, a forward direction of the drone may be controlled by adjusting the speed of each of the propellers, and in a case where a direction is required to be reversed, the direction of the drone may be reversed by adjusting the speed of each of the propellers differently or reversing some propellers.

FIGS. 14A to 14D are diagrams illustrating an example of a method for preventing a collision between a drone and a parachute according to an embodiment of the present invention.

Referring to FIGS. 14A to 14D, when it is expected that the propeller of the drone collides with the parachute or a connection portion connected to the parachute, it is possible to prevent the collision by controlling the speed of each of the propellers of the drone.

Specifically, the drone may determine whether or not the collision between the propeller of the drone and the parachute or the connection portion connected to the parachute occurs by using an angle of the drone, a distance between the drone and the parachute, or a speed of each of the drone and the parachute, and in each case, the collision may be prevented by adjusting the speed of each of the propellers of the drone.

Firstly, the drone may determine whether or not the collision between the propeller of the drone and the parachute or the connection portion connected to the parachute occurs by comparing an angle $\theta$ between the drone and the parachute with a threshold value.

Specifically, when the angle $\theta$ is greater than the threshold value, it is determined that the collision between the propeller of the drone and the parachute or the connection portion connected to the parachute is likely to occur, and when the angle $\theta$ is less than the threshold value, it is determined that the collision between the propeller of the drone and the parachute or the connection portion connected to the parachute is less likely to occur.

When it is determined that the collision between the propeller of the drone and the parachute or the connection portion connected to the parachute is likely to occur, the rotation speed of each of the propellers positioned in the upper portion, the middle portion, and/or the lower portion of the drone according to an inclined direction of the drone, among the one or more propellers, is decreased or increased, or each of the propellers positioned in the upper portion, the middle portion, and/or the lower portion of the drone according to an inclined direction of the drone, among the one or more propellers, is reversed, such that the angle θ may be adjusted to be less than the threshold value.

At this time, the angle θ between the drone and the parachute may be measured by a sensor measuring the angle of the drone, such as a Gyro sensor or the like.

Secondly, the drone may determine whether or not the collision between the propeller of the drone and the parachute or the connection portion connected to the parachute occurs by comparing a distance between the drone and the parachute with a threshold value.

Specifically, when the distance value is less than the threshold value, it is determined that the collision between the propeller of the drone and the parachute or the connection portion connected to the parachute is likely to occur, and when the distance value is greater than the threshold value, it is determined that the collision between the propeller of the drone and the parachute or the connection portion connected to the parachute is less likely to occur.

When it is determined that the collision between the propeller of the drone and the parachute or the connection portion connected to the parachute is likely to occur, the rotation speed of each of the propellers positioned in the upper portion, the middle portion, and/or the lower portion of the drone according to an inclined direction of the drone, among the one or more propellers, is decreased or increased, or each of the propellers positioned in the upper portion, the middle portion, and/or the lower portion of the drone according to an inclined direction of the drone, among the one or more propellers, is reversed, such that the distance value may be adjusted to be greater than the threshold value.

At this time, the distance between the drone and the parachute may be measured by sensors each attached to the parachute and the drone.

Thirdly, the drone may determine whether or not the collision between the propeller of the drone and the parachute or the connection portion connected to the parachute occurs by comparing the speed (first speed) of the drone with the speed (second speed) of the parachute.

Specifically, when the first speed is greater than the second speed, it is determined that the collision between the propeller of the drone and the parachute or the connection portion connected to the parachute is likely to occur, and when the first speed is less than the second speed, it is determined that the collision between the propeller of the drone and the parachute or the connection portion connected to the parachute is less likely to occur.

When it is determined that the collision between the propeller of the drone and the parachute or the connection portion connected to the parachute is likely to occur, the rotation speed of each of the propellers positioned in the upper portion, the middle portion, and/or the lower portion of the drone, among the one or more propellers, is decreased or increased, or each of the propellers positioned in the upper portion, the middle portion, and/or the lower portion of the drone, among the one or more propellers, is reversed, such that the first speed may be adjusted to be slower than the second speed.

In addition, in a case where it is attempted to decrease the speed of the drone or to reverse the direction of the drone, the rotation speed of each of the propellers positioned in the upper portion, the middle portion, and/or the lower portion of the drone may be decreased or increased, or each of the propellers positioned in the upper portion, the middle portion, and/or the lower portion of the drone may be reversed.

As an example of the above method, it is assumed that the propeller positioned in the upper portion of the drone is always stopped, a general maximum inclined angle of the drone is 35°, and a threshold value of an angle is 30°.

As illustrated in FIG. 14A, when the speed of the drone is decreased or the drone is inclined forward by the threshold value or greater, the rotation speed of the propeller positioned in the middle portion of the drone is increased, and the rotation speed of the propeller positioned in the lower portion of the drone is decreased or the propeller positioned in the lower portion of the drone is reversed, such that the speed of the drone may be decreased or the inclined angle between the drone and the parachute may be decreased.

As illustrated in FIG. 14B, when the speed of the drone is increased or the drone is inclined backward by the threshold value or greater, the rotation speed of the propeller positioned in the middle portion of the drone is decreased or the propeller positioned in the middle portion of the drone is reversed, and the rotation speed of the propeller positioned in the lower portion of the drone is increased, such that the speed of the drone may be increased or the inclined angle between the drone and the parachute may be decreased.

As illustrated in FIG. 14C, when the drone is attempted to change a direction to the right or the drone is inclined to the left side (front direction of the drawing) by the threshold value or greater, the speed of the propeller positioned in the left middle and lower portion which is an inclined side of the drone is increased, and the speed of the propeller positioned in the right middle and lower portion of the drone is decreased or the propeller positioned in the right middle and lower portion of the drone is reversed, such that the drone may be rotated to the right side or the inclined angle between the drone and the parachute may be decreased.

As illustrated in FIG. 14D, when the drone is attempted to change the direction to the left or the drone is inclined to the right side (rear direction of the drawing) by the threshold value or greater, the speed of the propeller positioned in the left middle and lower portion which is an inclined side of the drone is decreased or the propeller positioned in the left middle and lower portion which is an inclined side of the drone is reversed, and the speed of the propeller positioned in the right middle and lower portion of the drone is increased, such that the drone may be rotated to the left side or the inclined angle between the drone and the parachute may be decreased.

As such, by adjusting the speed of each of the propellers, it is possible to control the speed increase and decrease and the direction change of the drone, and to prevent the collision with the parachute.

Figure 15:
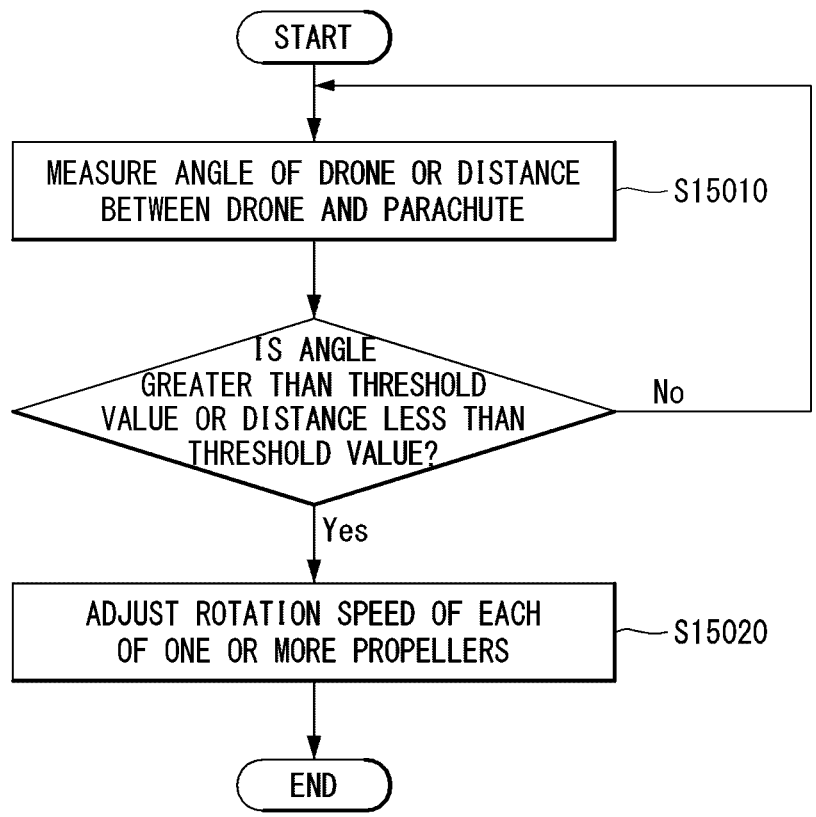
FIG. 15 is a flowchart illustrating an example of a method for preventing a collision between an unmanned aerial robot and a parachute according to an embodiment of the present invention.

FIG. 15 is a flowchart illustrating an example of a method for preventing a collision between a drone and a parachute according to an embodiment of the present invention.

Figure 14:
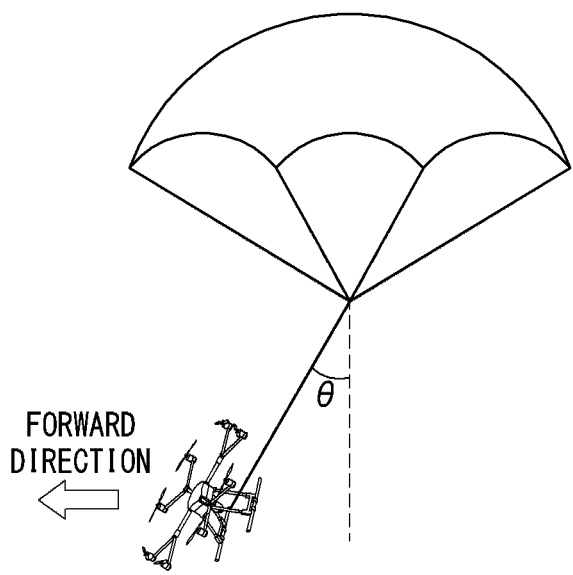
FIGS. 14A to 14D are diagrams illustrating an example of a method for preventing a collision between an unmanned aerial robot and a parachute according to an embodiment of the present invention.
Figure 14:
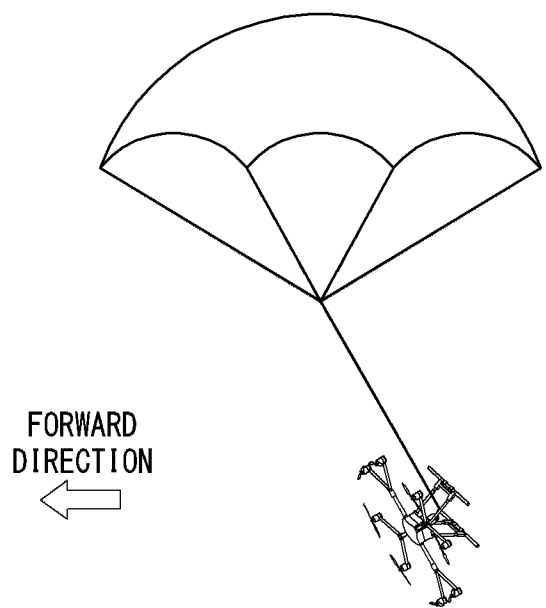
Figure 14:
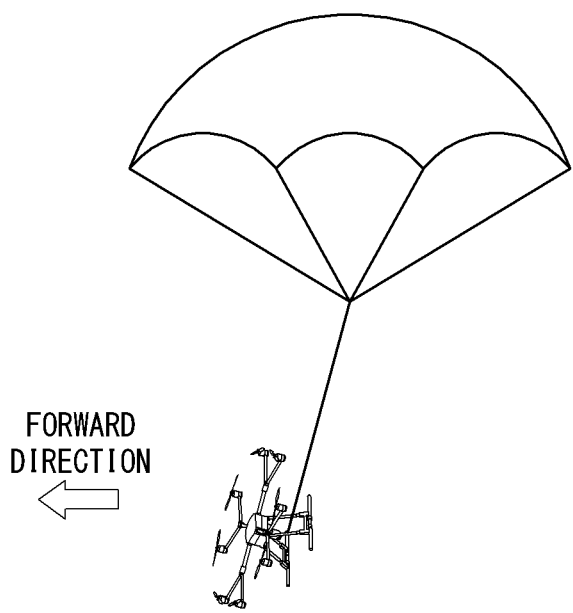
Figure 14:

Referring to FIG. 15, it is determined whether or not the collision between the drone and the parachute occurs by measuring the angle and distance as described in FIG. 14, such that the collision between the drone and the parachute may be prevented.

Specifically, an angle between the drone and the parachute or a distance between the drone and the parachute is measured by using a sensor (for example, a Gyro sensor, a speed sensor, and/or a distance measuring sensor) mounted in the drone (S15010).

The drone may determine whether or not the collision between the propeller of the drone and the parachute occurs by comparing the measured angle with the threshold value or the measured distance with the threshold value.

The threshold value may mean a minimum angle between the parachute and the drone for preventing the collision between the propeller of the drone and the parachute or may mean a minimum distance between the parachute and the drone for preventing the collision between the one or more propellers and the parachute.

When the measured angle is greater than the threshold value or the measured distance is less than the threshold value, as described in FIGS. 11 to 14, the rotation speed of each of the propellers positioned in the upper portion, the middle portion, and the lower portion of the drone is adjusted, such that the collision between the propeller of the drone and the parachute may be prevented (S15020).

That is, the rotation speed of each of the propellers is increased or decreased, or each of the propellers is reversed, the angle between the drone and the parachute may be equal to or less than the threshold value or the distance between the drone and the parachute may be greater than the threshold value.

Figure 16:
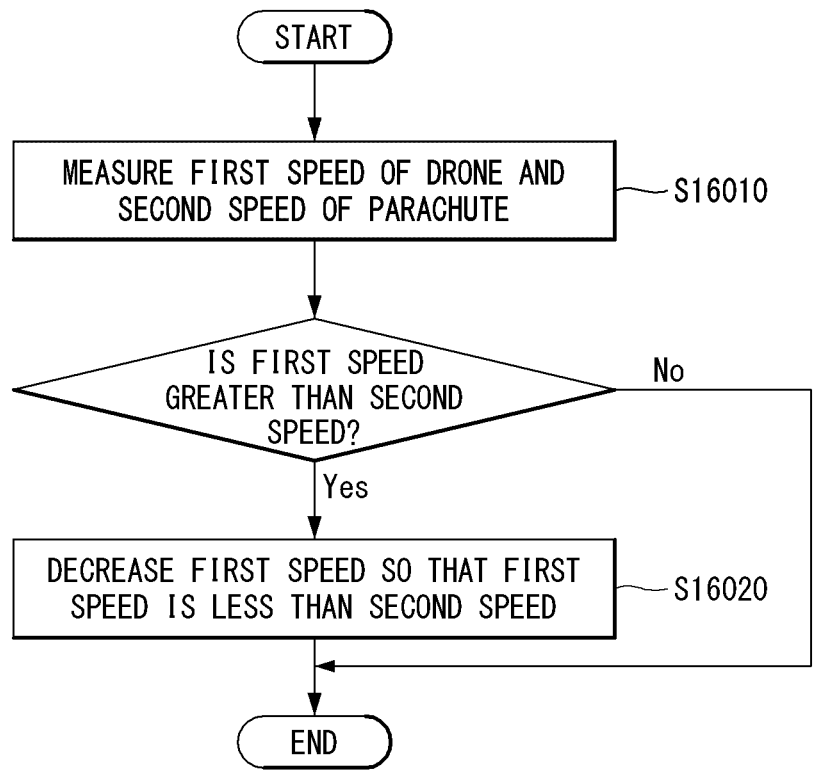
FIG. 16 is a flowchart illustrating another example of a method for preventing a collision between an unmanned aerial robot and a parachute according to an embodiment of the present invention.

FIG. 16 is a flowchart illustrating another example of a method for preventing a collision between a drone and a parachute according to an embodiment of the present invention.

Referring to FIG. 16, it is determined that whether or not the collision between the drone and the parachute occurs by measuring the speed of each of the drone and the parachute as described in FIG. 14, such that the collision between the drone and the parachute may be prevented.

Specifically, a speed (first speed) of the drone and a speed (second speed) of the parachute may be measured by using a sensor (for example, a Gyro sensor, a speed sensor, and/or a distance measuring sensor) mounted in the drone (S16010).

The drone may determine whether or not the collision between the propeller of the drone and the parachute occurs by comparing the first speed with the second speed.

When the first speed is greater than the second speed, as described in FIGS. 11 to 14, the rotation speed of each of the propellers positioned in the upper portion, the middle portion, and the lower portion of the drone is adjusted, such that the collision between the propeller of the drone and the parachute may be prevented (S16020).

That is, the first speed may be decreased by increasing or decreasing the rotation speed of each of the propellers, or reversing each of the propellers so that the first speed is less than the second speed.

Figure 17:
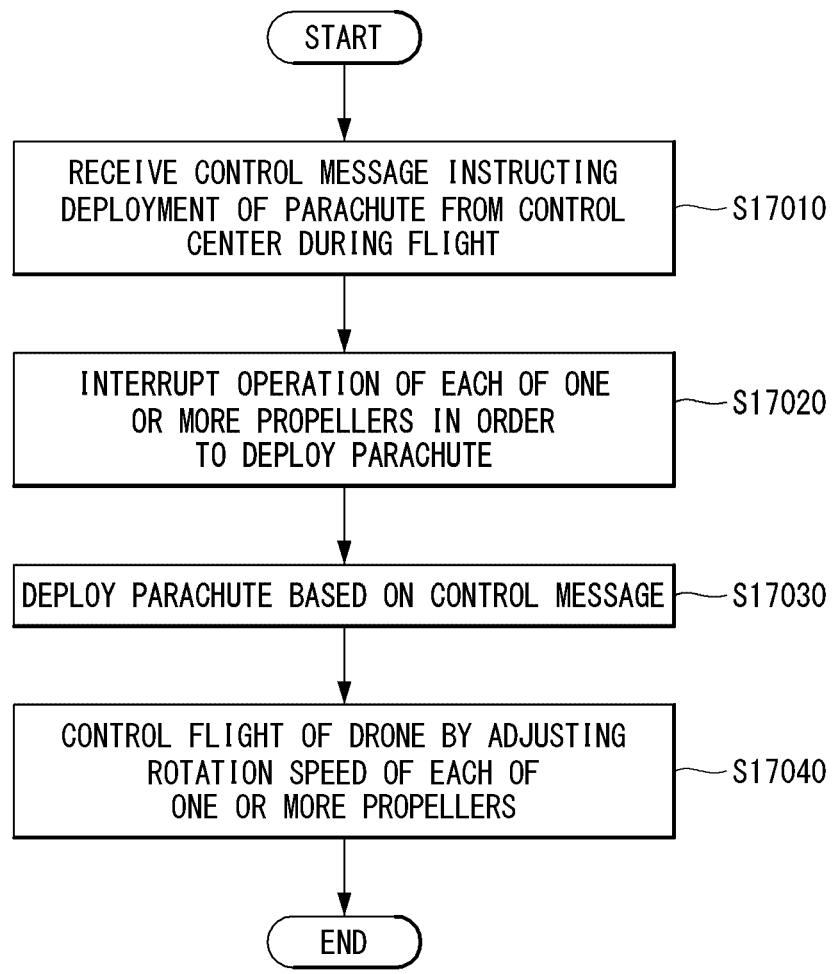
FIG. 17 is a flowchart illustrating an example of a flight control method by deploying a parachute of an unmanned aerial robot according to an embodiment of the present invention.

FIG. 17 is a flowchart illustrating an example of a flight control method by deploying a parachute of a drone according to an embodiment of the present invention.

Referring to FIG. 17, the flight duration and the moving distance may be increased by deploying the parachute during flight and the collision between the propeller of the drone and the parachute may be prevented by adjusting the rotation speed of each of the propellers.

Specifically, the drone receives a control message instructing deployment of the parachute from the base station during the flight (S17010).

At this time, the control message is one of the specific conditions for deploying the parachute, the parachute may be deployed from the drone by determining whether or not the following specific condition for deploying the parachute is satisfied.

A case where a moving distance calculated based on a current speed of the drone 100 and a remaining amount of a battery is smaller than a distance to a destination A case where a flight duration of the drone is required to be increased (for example, a case where since flight is required to be longer than a preset flight operation, a battery capacity is required more than a remaining amount of a battery)

A case where a control message instructing deployment of the parachute is received from a control center A case where an altitude of the drone is rapidly decreased or a case where it is determined that the drone is falling when a falling speed of the drone is greater than a threshold value When the drone is falling, a case where an altitude of the drone is equal to or less than a threshold value indicating a minimum altitude at which breakage of the drone may be prevented At this time, the base station receives the state information from a terminal as in the methods described in FIGS. 11 and 12 and determines whether or not the drone can fly to a destination based on the state information, such that a control message instructing the drone to whether or not the parachute is deployed.

Alternatively, as in the methods described in FIGS. 11 and 12, the drone may determine whether or not the parachute is deployed by determining whether or not the specific condition is satisfied.

Next, in order to deploy the parachute, an operation of each of the one or more propellers of the drone may be interrupted. In order to interrupt the operation of each of the one or more propellers of the drone, an operation of the one or more motors connected to the one or more propellers may be interrupted (S17020).

When the operation of each of the one or more propellers of the drone is interrupted, the drone may deploy the parachute depending on the control message or the satisfaction of the specific condition.

At this time, the parachute may be provided in the main body of the drone and may be deployed toward an area beside the drone in order to prevent the collision with the one or more propellers.

When the parachute is deployed from the drone, it is determined whether or not the amount of altitude change is stable by measuring the amount of altitude change of the drone as in the methods described in FIGS. 11 to 14.

That is, it is determined whether or not the amount of altitude change is in a range (for example, 0.5 to 0.7 m/s) in which it is determined that the amount of altitude change is stable, and when the amount of altitude change is in the above range, the one or more propellers may be operated again.

In this case, an operation of a propeller positioned in the upper portion of the drone, among the one or more propellers, may be continuously interrupted due to a possibility of collision with the parachute.

Next, the flight of the drone may be controlled by adjusting the rotation speed of each of the one or more propellers by using the methods described in FIGS. 11 to 16.

That is, the rotation speed of each of the propellers positioned in the middle portion and the lower portion of the drone, among the one or more propellers, is increased or decreased, or each of the propellers positioned in the middle portion and the lower portion of the drone, among the one or more propellers, is reversed, such that the collision between the drone and the parachute may be prevented and the direction change and the speed increase and decrease of the drone may be controlled.

By such a method, the flight duration and the moving distance of the drone may be increased by deploying the parachute, and the speed of each of the one or more propellers is adjusted, such that the collision with the drone due to the deployment of the parachute may be prevented, and a direction change and a speed increase and decrease of the drone may be adjusted.

Hereinafter, referring to FIGS. 1 to 4 and FIGS. 11 to 17, the method for controlling a movement of a drone, which is proposed in the present specification and implemented in the drone, will be described in detail.

A drone may include a main body, one or more motors, one or more propellers connected to the one or more motors, respectively, a transmitter and a receiver, respectively, transmitting and receiving a radio signal, and a processor electrically connected to the one or more motors to control the one or more motors, and functionally connected to the transmitter and the receiver.

The processor of the drone controls the receiver to receive a control message instructing the deployment of the parachute from the base station during the flight.

At this time, the base station receives the state information from the terminal as in the methods described in FIGS. 11 and 12 and determines whether or not the drone can fly to a destination based on the state information, such that a control message instructing the drone to whether or not the parachute is deployed.

Alternatively, as in the methods described in FIGS. 11 and 12, the processor of the drone determines whether or not the parachute is deployed by determining whether or not the specific condition is satisfied.

Next, the processor of the drone may control the one or more motors to interrupt the operation of each of the one or more propellers of the drone in order to deploy the parachute.

When the operation of each of the one or more propellers is interrupted, the processor of the drone may allow the parachute to be deployed depending on the control message or the satisfaction of the specific condition.

In this case, the parachute may be provided in the main body of the drone and may be deployed toward an area beside the drone in order to prevent the collision with the one or more propellers.

When the parachute is deployed, the processor of the drone determines whether the amount of altitude change is stable by measuring the amount of altitude change of the drone as in the methods described in FIGS. 11 to 14.

That is, it is determined whether or not the amount of altitude change is in a range (for example, 0.5 to 0.7 m/s) in which it is determined that the amount of altitude change is stable, and when the amount of altitude change is in the above range, the one or more propellers may be operated again.

In this case, an operation of a propeller positioned in the upper portion of the drone, among the one or more propellers, may be continuously interrupted due to a possibility of collision with the parachute.

Next, the processor of the drone may control the flight of the drone by controlling the one or more motors and the one or more propellers to adjust the rotation speed of each of the one or more propellers by using the methods described in FIGS. 11 to 16.

That is, the processor of the drone increases or decreases the rotation speed of each of the propellers positioned in the middle portion and the lower portion of the drone, among the one or more propellers, or reverses each of the propellers positioned in the middle portion and the lower portion of the drone, among the one or more propellers, such that the collision between the drone and the parachute may be prevented and the direction change and the speed increase and decrease of the drone may be controlled.

Apparatus to which the Present Invention can be Applied

Figure 18:
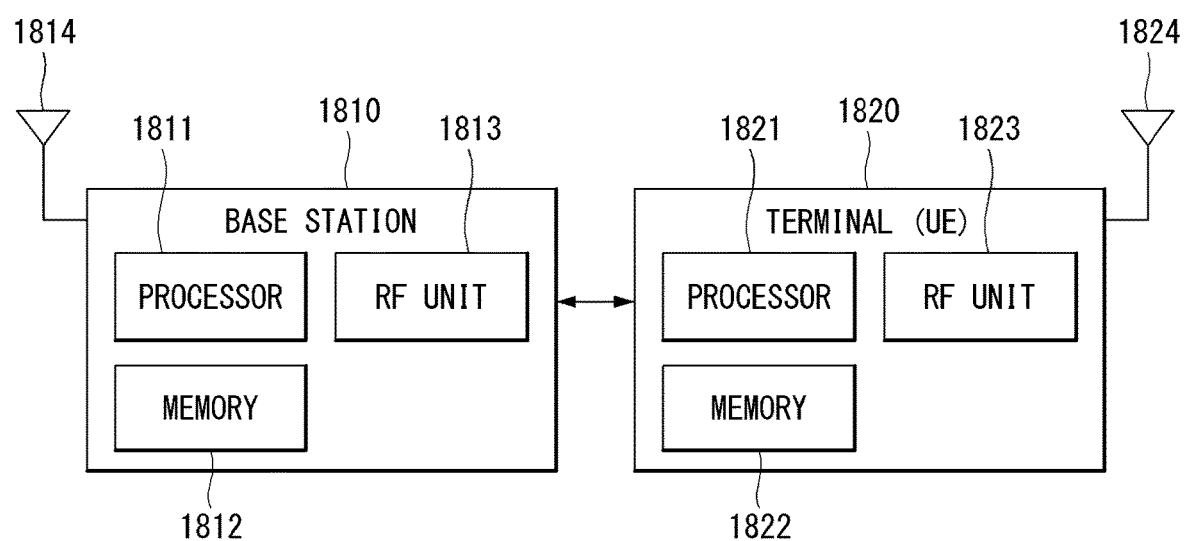
FIG. 18 is a block diagram of a wireless communication apparatus according to an embodiment of the present invention.

FIG. 18 is a block diagram of a wireless communication apparatus according to an embodiment of the present invention.

Referring to FIG. 18, a wireless communication system includes a base station (or network) 1810 and a terminal 1820.

Here, the terminal may be a user equipment (UE), an unmanned aerial vehicle (UAV), a drone, a wireless aerial robot, or the like.

The base station 1810 includes a processor 1811, a memory 1812, and a communication module 1813.

The processor implements the functions, procedures, and/or methods proposed in FIGS. 1 to 17. Layers of a wired/wireless interface protocol may be implemented by the processor 1811. The memory 1812 is connected to the processor 1811 and stores various information for driving the processor 1811. The communication module 1813 is connected to the processor 1811 to transmit and/or receive a wired/wireless signal.

The communication module 1813 may include a radio frequency unit for transmitting/receiving a radio signal.

The terminal 1820 includes a processor 1821, a memory 1822, and a communication module (or RF section) 1823. The processor 1821 implements the functions, procedures, and/or methods proposed in FIGS. 1 to 17. Layers of a wireless interface protocol may be implemented by the processor 1821. The memory 1822 is connected to the processor 1821 and stores various information for driving the processor 1821. The communication module 1823 is connected to the processor 1821 to transmit and/or receive a wireless signal.

The memories 1812 and 1822 may be located inside or outside the processors 1811 and 1821, respectively, and may be connected to the processors 1811 and 1821 by using various well-known means, respectively.

In addition, the base station 1810 and/or the terminal 1820 may have a single antenna or multiple antennas.

Figure 19:
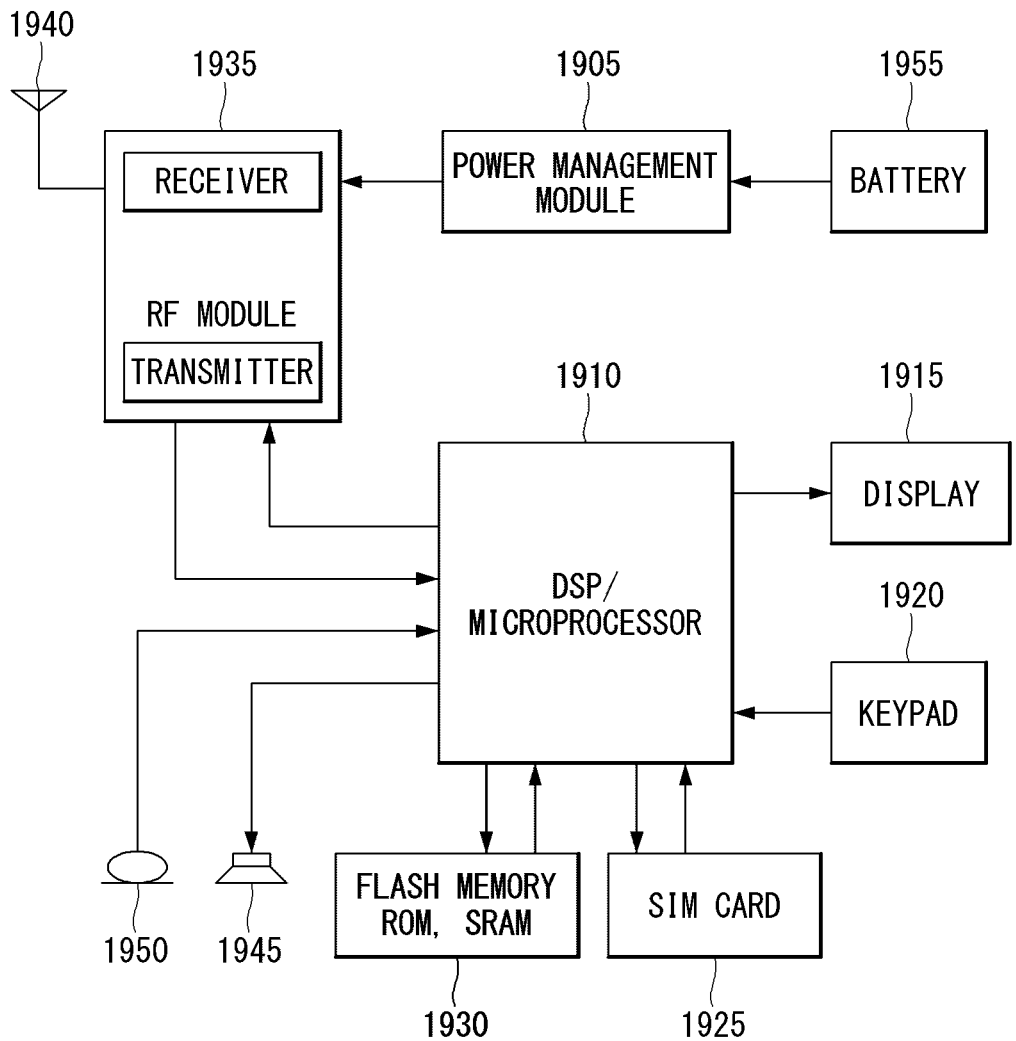
FIG. 19 is a block diagram of a communication apparatus according to an embodiment of the present invention.

FIG. 19 is a block diagram of a communication apparatus according to an embodiment of the present invention.

In particular, FIG. 19 is a diagram illustrating an example of the terminal of FIG. 18 in more detail.

Referring to FIG. 19, the terminal may include a processor (or digital signal processor (DSP)) 1910, an RF module (or RF unit) 1935, a power management module 1905, an antenna 1940, a battery 1955, a display 1915, a keypad 1920, a memory 1930, a subscriber identification module (SIM) card 1925 (which may be optional), a speaker 1945, and a microphone 1950. The terminal may include a single antenna or multiple antennas.

The processor 1910 implements the functions, procedures, and/or methods proposed in FIGS. 1 to 17. Layers of a wireless interface protocol may be implemented by the processor 1910.

The memory 1930 is connected to the processor 1910 and stores various information related to an operation of the processor 1910. The memory 1930 may be located inside or outside the processor 1910 and may be connected to the processor 1910 by using various well-known means.

A user inputs command information, such as a telephone number or the like, by pressing (or touching) a button of the keypad 1920 or by voice activation using the microphone 1950, for example. The processor 1910 processes a proper function such as receiving such command information or making a call to a telephone number so that the function is performed. Optional data may be extracted from the SIM card 1925 or the memory 1930. Furthermore, the processor 1910 may display command information or driving information on the display 1915 so that a user can recognize the information and for convenience.

The RF module 1935 is connected to the processor 1910 to transmit and/or receive an RF signal. The processor 1910 transfers command information to the RF module 1935 so that a radio signal forming voice communication data, for example, is transmitted in order to initiate communication. The RF module 1935 includes a receiver and a transmitter, respectively, for receiving and transmitting a radio signal. The antenna 1940 functions to transmit and receive a radio signal. When the RF module 1935 receives a radio signal, the RF module 1935 transfers the signal for the processing of the processor 1910 and may convert the signal into a baseband. The processed signal may be converted into audible or readable information through which the speaker 1945 outputs.

In the aforementioned embodiments, the elements and features of the present invention have been combined in specific forms. Each of the elements or features may be considered to be optional unless otherwise described explicitly. Each of the elements or features may be implemented in a form to be not combined with other elements or features. Furthermore, some of the elements and/or the features may be combined to form an embodiment of the present invention. Order of the operations described in the embodiments of the present invention may be changed. Some of the elements or features of an embodiment may be included in another embodiment or may be replaced with corresponding elements or features of another embodiment. It is apparently understandable that claims failing to be explicitly cited in the appended claims are combined to construct new embodiments or can be included as new claims by amendment after filing the application.

The embodiment according to the present invention may be implemented by various means, for example, hardware, firmware, software or a combination of them. In the case of an implementation by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, and the like.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor by various well-known means.

According to the present invention, the flight of the unmanned aerial robot may be controlled by 5G communication technology.

In addition, according to the present invention, the flight duration and the moving distance of the unmanned aerial robot may be increased by deploying the parachute provided in the unmanned aerial robot.

In addition, according to the present invention, when the parachute of the unmanned aerial robot is deployed, the collision between the parachute and the propeller may be prevented by adjusting the speed of each of the one or more propellers of the unmanned aerial robot.

It will be apparent to those skilled in the art that the present invention may be embodied in other specific forms without departing from the essential features of the present invention. Accordingly, the detailed description is not construed as being limited in all aspects and should be considered as illustrative. The scope of the present invention should be determined by reasonable interpretation of the appended claims, and all modifications within equivalent ranges of the present invention are included in the scope of the present invention.

INDUSTRIAL APPLICABILITY

Although the method for controlling an operation and a posture of a drone has been described based on examples applying to 3GPP LTE/LTE-A system and 5 G system, they are also applicable to various other wireless communication systems.

What is claimed is:

1. A method for controlling flight of a drone, comprising:
   determining whether or not a specific condition for deploying a parachute during the flight is satisfied;
   stopping an operation of at least one propeller located in a deployment direction of the parachute when the specific condition is satisfied;
   deploying the parachute toward an area beside the drone; and
   controlling the flight of the drone by adjusting a rotation speed of each of the at least one propeller.

2. The method of claim 1, wherein the specific condition is one of receiving a control message instructing deployment of the parachute from a base station, whether or not the drone reaches a destination, a flight duration increase, or a crash.

3. The method of claim 2, further comprising, when the specific condition is whether or not the drone reaches a destination:
   calculating an expected flight distance based on a remaining amount of a battery; and
   comparing the expected flight distance with a flight distance to the destination,
   wherein the parachute is deployed when the expected flight distance is smaller than the flight distance.

4. The method of claim 1, wherein, a propeller closest to the parachute among the at least one propeller is not operated.

5. The method of claim 1, wherein the controlling comprises:
   controlling the rotation speed of each of the at least one propeller to prevent a collision between the at least one propeller and the parachute;
   controlling the rotation speed of each of the at least one propeller to change a direction of the drone; and
   controlling the rotation speed of each of the at least one propeller to change a speed of the drone.

6. The method of claim 1, wherein the controlling of the rotation speed of each of the at least one propeller to prevent a collision with the parachute is performed by comparing an angle between the drone and the parachute with a threshold value, and the threshold value means a minimum angle between the parachute and the drone for preventing a collision between the one or more propellers and the parachute.

7. The method of claim 6, wherein when the angle is equal to or greater than the threshold value, a rotation speed of a propeller positioned in a middle portion of the drone among the at least one propeller is increased or decreased, and a rotation speed of a propeller positioned in a lower portion of the drone among at least one propeller is increased or decreased.

8. The method of claim 1, wherein in the controlling of the rotation speed of each of at least one propeller to change a direction of the drone, a rotation speed of a propeller positioned in a middle portion of the drone among at least one propeller is increased or decreased according to a direction change of the drone, and a rotation speed of a propeller positioned in a lower portion of the drone among the at least one propeller is increased or decreased.

9. The method of claim 1, wherein the controlling of the rotation speed of each of the at least one propeller to prevent a collision with the parachute is performed by comparing a distance between the drone and the parachute with a threshold value, and wherein the threshold value means a minimum distance between the parachute and the drone for preventing a collision between the one or more propellers and the parachute.

10. The method of claim 9, wherein the distance is measured by a first sensor of the parachute and a second sensor of the drone.

11. The method of claim 9, wherein when the distance is equal to or less than the threshold value, a rotation speed of a propeller positioned in a middle portion of the drone among at least one propeller is increased or decreased, and a rotation speed of a propeller positioned in a lower portion of the drone among the one or more propellers is increased or decreased.

12. The method of claim 1, wherein the controlling of the rotation speed of each of the one or more propellers to prevent a collision with the parachute is performed by comparing a first speed of the drone with a second speed of the parachute.

13. The method of claim 12, wherein when the first speed is less than the second speed, the first speed is decreased by decreasing the rotation speed of each of the one or more propellers.

14. A drone comprising:
a main body;
one or more motors;
at least one propeller connected to the one or more motors, respectively;
a transmitter and a receiver, respectively, transmitting and receiving a radio signal; and
a processor electrically connected to the one or more motors to control the one or more motors and functionally connected to the transmitter and the receiver,
wherein the processor is configured to:
determine whether or not a specific condition for deploying a parachute during flight is satisfied;
stop an operation a propeller among the at least one propeller that is located in a deployment direction of the parachute when the specific condition is satisfied;
deploy the parachute based on a control message,
wherein the parachute is deployed to the side of the drone; and
control the flight of the drone by adjusting a rotation speed of each of the at least one propeller.

15. The drone of claim 14, wherein the specific condition is one of receiving a control message instructing deployment of the parachute from a base station, whether or not the drone reaches a destination, a flight duration increase, or a crash.

16. The drone of claim 15, wherein, when where the specific condition is whether or not the drone reaches a destination, the processor calculates an expected flight distance based on a remaining amount of a battery, and compares the expected flight distance with a flight distance to the destination, and the parachute is deployed when the expected flight distance is smaller than the flight distance.

17. The drone of claim 14, wherein a propeller closest to the parachute among the at least one propeller is not operated.

18. The drone of claim 14, wherein the processor controls the rotation speed of each of the at least one propeller to prevent a collision between the one at least one propeller and the parachute, controls the rotation speed of each of the at least one propeller to change a direction of the drone, and controls the rotation speed of each of the at least one propeller to change a speed of the drone.

19. The drone of claim 14, wherein the controlling of the rotation speed of each of the at least one propeller to prevent a collision with the parachute is performed by comparing an angle between the drone and the parachute with a threshold value, and the threshold value means a minimum angle between the parachute and the drone for preventing a collision between the at least one propeller and the parachute.

20. The drone of claim 19, wherein when the angle is equal to or greater than the threshold value, a rotation speed of a propeller positioned in a middle portion of the drone among the at least one propeller is increased or decreased, and a rotation speed of a propeller positioned in a lower portion of the drone among the at least one propeller is increased or decreased.

* * * * *